(12) United States Patent
Rousseau et al.

(10) Patent No.: US 11,227,466 B2
(45) Date of Patent: Jan. 18, 2022

(54) MULTI-CURRENCY DIGITAL WALLETS AND GAMING ARCHITECTURES

(71) Applicant: Aristocrat Technologies, Inc., Las Vegas, NV (US)

(72) Inventors: Michele Rousseau, Las Vegas, NV (US); Alfred Thomas, Ventura, CA (US); Larry Pacey, Calabasas, CA (US); Boris Amegadjie, Chicago, IL (US); Joseph Masinter, II, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 16/947,987

(22) Filed: Aug. 26, 2020

(65) Prior Publication Data
US 2021/0065505 A1 Mar. 4, 2021

Related U.S. Application Data

(60) Provisional application No. 62/894,102, filed on Aug. 30, 2019.

(51) Int. Cl.
*G07F 17/32* (2006.01)
*G06Q 20/38* (2012.01)
*G06Q 20/36* (2012.01)

(52) U.S. Cl.
CPC ......... *G07F 17/3244* (2013.01); *G06Q 20/36* (2013.01); *G06Q 20/381* (2013.01); *G07F 17/3211* (2013.01); *G07F 17/3288* (2013.01)

(58) Field of Classification Search
USPC ........................................... 463/25
See application file for complete search history.

(56) References Cited

U.S. PATENT DOCUMENTS

| | | | |
|---|---|---|---|
| 4,986,330 A | 1/1991 | McGonagle |
| 6,230,658 B1 | 5/2001 | Rudolph |
| 6,394,907 B1 | 5/2002 | Rowe |
| 6,510,572 B2 | 1/2003 | Horowitz |
| 6,585,598 B2 | 7/2003 | Nguyen |
| 6,739,975 B2 | 5/2004 | Nguyen |
| 6,835,134 B2 | 12/2004 | Poole |

(Continued)

FOREIGN PATENT DOCUMENTS

| | | |
|---|---|---|
| EP | 0979604 A1 | 2/2000 |
| EP | 3280643 B1 | 4/2020 |

(Continued)

OTHER PUBLICATIONS

Office Action dated Nov. 2, 2020 for U.S. Appl. No. 16/586,168 (pp. 1-7).

(Continued)

*Primary Examiner* — Pierre E Elisca
(74) *Attorney, Agent, or Firm* — Weaver Austin Villeneuve & Sampson LLP

(57) ABSTRACT

Multi-currency digital wallet systems for use in casino gaming and other contexts are described. Such digital wallets may allow for balances of a variety of different types of currencies to be tracked and managed by a user. Multi-currency gaming machines are also described; such gaming machines may provide award amounts in different currencies dependent on a particular game outcome.

20 Claims, 15 Drawing Sheets

(56) References Cited

U.S. PATENT DOCUMENTS

| | | |
|---|---|---|
| 6,846,238 B2 | 1/2005 | Wells |
| 6,866,586 B2 | 3/2005 | Oberberger |
| 6,925,307 B1 | 8/2005 | Mamdani |
| 7,114,718 B2 | 10/2006 | Grauzer |
| 7,169,053 B2 | 1/2007 | Moik |
| 7,240,036 B1 | 7/2007 | Mamdani |
| 7,285,046 B2 | 10/2007 | Papulov |
| 7,370,012 B2 | 5/2008 | Karns |
| 7,390,263 B1 | 6/2008 | Acres |
| 7,419,428 B2 | 9/2008 | Rowe |
| 7,559,462 B2 | 7/2009 | Brosnan |
| 7,749,079 B2 | 7/2010 | Chamberlain |
| 7,771,277 B2 | 8/2010 | Chamberlain |
| 7,819,742 B2 | 10/2010 | Chamberlain |
| 7,918,728 B2 | 4/2011 | Nguyen |
| 7,997,978 B2 | 8/2011 | Kaminkow et al. |
| 8,057,303 B2 | 11/2011 | Rasmussen |
| 8,226,255 B2 | 7/2012 | Fan |
| 8,333,653 B2 | 12/2012 | Nyman |
| 8,382,582 B2 | 2/2013 | Sammon |
| 8,393,955 B2 | 3/2013 | Arezina et al. |
| 8,449,378 B2 | 5/2013 | Michaelson |
| 8,463,711 B2 | 6/2013 | Cunningham, II |
| 8,469,800 B2 | 6/2013 | Lemay |
| 8,523,657 B2 | 9/2013 | Michaelson |
| 8,602,874 B2 | 12/2013 | Rowe |
| 8,613,659 B2 | 12/2013 | Nelson |
| 8,714,655 B2 | 5/2014 | Cahall |
| 8,870,647 B2 | 10/2014 | Huizinga |
| 8,875,639 B2 | 11/2014 | Summerville |
| 8,956,222 B2 | 2/2015 | Lemay |
| 8,961,298 B2 | 2/2015 | Czyzewski |
| 8,992,306 B2 | 3/2015 | Iddings et al. |
| 9,058,716 B2 | 6/2015 | Rajaraman |
| 9,153,095 B2 | 10/2015 | Adiraju |
| 9,159,189 B2 | 10/2015 | Froy, Jr. |
| 9,167,383 B1 | 10/2015 | Barrand |
| 9,226,578 B2 | 1/2016 | Battey |
| 9,235,953 B2 | 1/2016 | Earley |
| 9,245,414 B2 | 1/2016 | Radisich |
| 9,269,231 B2 | 2/2016 | Curtin |
| 9,311,769 B2 | 4/2016 | Lemay |
| 9,317,995 B2 | 4/2016 | Nyman |
| 9,324,209 B2 | 4/2016 | Cunningham, II |
| 9,367,835 B2 | 6/2016 | Nelson |
| 9,418,519 B2 | 8/2016 | Walker |
| 9,437,073 B2 | 9/2016 | LeStrange et al. |
| 9,454,872 B2 | 9/2016 | Muir |
| 9,483,901 B2 | 11/2016 | Nguyen |
| 9,501,899 B2 | 11/2016 | Radisich |
| 9,530,277 B2 | 12/2016 | Nelson |
| 9,576,425 B2 | 2/2017 | Nguyen |
| 9,580,031 B2 | 2/2017 | Kalis |
| 9,613,491 B2 | 4/2017 | Roth |
| 9,629,064 B2 | 4/2017 | Graves |
| 9,659,444 B2 | 5/2017 | Norris |
| 9,666,027 B2 | 5/2017 | Curtin |
| 9,756,607 B1 | 9/2017 | Deluca |
| 9,786,123 B2 | 10/2017 | Huizinga |
| 9,852,578 B2 | 12/2017 | Nelson |
| 9,875,499 B2 | 1/2018 | Washington |
| 9,875,607 B2 | 1/2018 | Nelson |
| 9,881,444 B2 | 1/2018 | Nelson |
| 9,928,502 B2 | 3/2018 | Curtin |
| 9,928,689 B2 | 3/2018 | Walker |
| 9,941,753 B2 | 4/2018 | Asanuma |
| 9,974,873 B2 | 5/2018 | Cole |
| 9,999,699 B2 | 6/2018 | Sinai |
| 10,013,850 B2 | 7/2018 | Nelson |
| 10,032,334 B2 | 7/2018 | Cuddy |
| 10,097,018 B2 | 10/2018 | Park |
| 10,121,129 B2 | 11/2018 | Kalgi |
| 10,121,318 B2 | 11/2018 | LeMay et al. |
| 10,121,319 B2 | 11/2018 | Radisich |
| 10,131,432 B2 | 11/2018 | Simeon |
| 10,134,223 B2 | 11/2018 | Mandava |
| 10,134,234 B2 | 11/2018 | LeStrange et al. |
| 10,140,810 B1 | 11/2018 | Boyle |
| 10,157,518 B2 | 12/2018 | Johnson |
| 10,158,243 B2 | 12/2018 | Kim |
| 10,192,400 B2 | 1/2019 | Price |
| 10,192,401 B2 | 1/2019 | Nelson |
| 10,198,906 B2* | 2/2019 | Walker .................. G07F 17/34 |
| 10,217,317 B2 | 2/2019 | Nelson |
| 10,242,525 B1 | 3/2019 | Knust |
| 10,242,530 B2 | 3/2019 | Arnone et al. |
| 10,282,939 B2 | 5/2019 | Yamaguchi |
| 10,297,105 B2 | 5/2019 | Lemay |
| 10,339,755 B2 | 7/2019 | Snow |
| 10,360,761 B2 | 7/2019 | Higgins |
| 10,360,763 B2 | 7/2019 | Higgins |
| 10,373,430 B2 | 8/2019 | Higgins |
| 10,380,843 B2 | 8/2019 | Higgins |
| 10,417,867 B2 | 9/2019 | Nelson |
| 10,453,297 B2 | 10/2019 | Lemay |
| 10,460,560 B2 | 10/2019 | Cunningham, II |
| 10,460,563 B2 | 10/2019 | Miri |
| 10,529,179 B2* | 1/2020 | Weiss .................. G07F 17/3244 |
| 10,546,463 B2 | 1/2020 | Higgins |
| 10,573,129 B2 | 2/2020 | Higgins |
| 10,621,826 B2 | 4/2020 | Higgins |
| 10,643,426 B2 | 5/2020 | Higgins |
| 10,699,527 B2 | 6/2020 | Higgins |
| 10,706,683 B2 | 7/2020 | Higgins |
| 10,720,016 B2 | 7/2020 | Nelson |
| 10,726,668 B2 | 7/2020 | Nelson |
| 10,755,520 B2 | 8/2020 | Moore |
| 10,783,416 B2 | 9/2020 | Shigeta |
| 11,011,020 B2* | 5/2021 | Springer .............. G06Q 20/381 |
| 2005/0194827 A1 | 9/2005 | Dowty |
| 2006/0199648 A1 | 9/2006 | Mitchell |
| 2008/0045342 A1 | 2/2008 | Crowder, Jr. |
| 2008/0134601 A1 | 6/2008 | Cruz |
| 2008/0178774 A1 | 7/2008 | Saccani |
| 2008/0305855 A1 | 12/2008 | Czyzewski |
| 2009/0191933 A1 | 7/2009 | French |
| 2009/0252646 A1 | 10/2009 | Holden |
| 2010/0312625 A1 | 12/2010 | Miller |
| 2011/0306400 A1 | 12/2011 | Nguyen |
| 2013/0023339 A1 | 1/2013 | Davis |
| 2013/0303263 A1 | 11/2013 | Lemay |
| 2014/0015478 A1 | 1/2014 | Von Novak |
| 2014/0021798 A1 | 1/2014 | Kesler |
| 2014/0031107 A1* | 1/2014 | Walker ................ G07F 17/3255 463/25 |
| 2014/0203770 A1 | 7/2014 | Salter |
| 2014/0228109 A1 | 8/2014 | Azuma |
| 2015/0044098 A1 | 2/2015 | Smart |
| 2015/0086968 A1 | 3/2015 | Kolavo |
| 2015/0228153 A1 | 8/2015 | Hedrick |
| 2015/0243133 A1 | 8/2015 | Nicholas |
| 2016/0000951 A1 | 1/2016 | Kreiner |
| 2016/0027244 A1 | 1/2016 | Adiraju |
| 2016/0029155 A1 | 1/2016 | Kerr |
| 2016/0098891 A1 | 4/2016 | Eby |
| 2016/0133089 A1 | 5/2016 | Roemer |
| 2016/0180656 A1 | 6/2016 | Loose |
| 2016/0218545 A1 | 7/2016 | Schroeder |
| 2016/0234123 A1 | 8/2016 | Alisawi |
| 2016/0247354 A1* | 8/2016 | Arnone .............. G07F 17/3288 |
| 2017/0076540 A1 | 3/2017 | Saffari |
| 2017/0076546 A1* | 3/2017 | Walker ................ G07F 17/3244 |
| 2017/0092054 A1 | 3/2017 | Petersen |
| 2017/0092060 A1 | 3/2017 | Toohey et al. |
| 2017/0092061 A1 | 3/2017 | Nelson |
| 2017/0169657 A1 | 6/2017 | Keilwert |
| 2017/0213632 A1 | 7/2017 | Ozana |
| 2017/0278347 A1 | 9/2017 | Kukita |
| 2017/0279495 A1 | 9/2017 | Kim |
| 2017/0289154 A1 | 10/2017 | Krieger |
| 2018/0061179 A1 | 3/2018 | Miri |
| 2018/0075690 A1 | 3/2018 | Moore |
| 2018/0108213 A1 | 4/2018 | Sanford et al. |
| 2018/0357850 A1 | 12/2018 | Moore |

(56) References Cited

U.S. PATENT DOCUMENTS

| | | | |
|---|---|---|---|
| 2019/0066441 | A1 | 2/2019 | LeStrange et al. |
| 2019/0073873 | A1 | 3/2019 | Lemay |
| 2019/0096175 | A1 | 3/2019 | Higgins |
| 2019/0096180 | A1 | 3/2019 | Petersen |
| 2019/0102985 | A1* | 4/2019 | Higgins ............... G07F 17/3225 |
| 2019/0139356 | A1 | 5/2019 | Moya Garcia |
| 2019/0151752 | A1 | 5/2019 | Kim |
| 2019/0188951 | A1 | 6/2019 | Nelson |
| 2019/0188961 | A1 | 6/2019 | Higgins |
| 2019/0188962 | A1 | 6/2019 | Higgins |
| 2019/0188963 | A1 | 6/2019 | Higgins |
| 2019/0197526 | A1 | 6/2019 | Higgins |
| 2019/0197822 | A1 | 6/2019 | Shepherd |
| 2019/0197830 | A1 | 6/2019 | Petersen |
| 2019/0205866 | A1 | 7/2019 | Higgins |
| 2019/0244476 | A1 | 8/2019 | Miltenberger |
| 2019/0272704 | A1 | 9/2019 | Lemay |
| 2019/0325701 | A1 | 10/2019 | Higgins |
| 2020/0005595 | A1* | 1/2020 | Nelson ................ G06Q 20/3276 |
| 2020/0043284 | A1 | 2/2020 | Lemay |
| 2020/0058190 | A1 | 2/2020 | Cunningham, II |
| 2020/0111319 | A1 | 4/2020 | Palmisano |
| 2020/0134973 | A1 | 4/2020 | Higgins |
| 2020/0152005 | A1 | 5/2020 | Higgins |
| 2020/0302740 | A1 | 9/2020 | Cleveland |
| 2021/0019987 | A1* | 1/2021 | Cohen ................. G07F 17/3225 |
| 2021/0241575 | A1* | 8/2021 | Shepherd ............ G07F 17/3241 |

FOREIGN PATENT DOCUMENTS

| | | |
|---|---|---|
| GB | 2273088 A | 6/1994 |
| KR | 20090059283 A | 6/2009 |
| WO | 1999059451 A1 | 11/1999 |
| WO | 2017196732 A1 | 11/2017 |

OTHER PUBLICATIONS

Notice of Allowance dated Dec. 2, 2020 for U.S. Appl. No. 16/586,246 (pp. 1-10).
Office Action dated Dec. 2, 2020 for U.S. Appl. No. 16/586,356 (pp. 1-7).
Notice of Allowance dated Feb. 11, 2021 for U.S. Appl. No. 16/586,127 (pp. 1-15).
Notice of Allowance dated Feb. 12, 2021 for U.S. Appl. No. 16/586,168 (pp. 1-5).
International Search Report and Written Opinion for App. No. PCT/US19/53823, dated Jan. 3, 2020, 10 pages.
Corrected Notice of Allowability dated Apr. 14, 2021 for U.S. Appl. No. 16/586,127 (pp. 1-2).
Notice of Allowance dated Apr. 13, 2021 for U.S. Appl. No. 16/586,356 (pp. 1-5).
Notice of Allowance dated Apr. 29, 2021 for U.S. Appl. No. 16/586,168 (pp. 1-5).
Office Action dated Sep. 25, 2020 for U.S. Appl. No. 16/264,875 (pp. 1-12).
AU Examination Report for AU Application No. 2018204598, dated Mar. 20, 2019. 5 pages.
Office Action dated Apr. 29, 2020 for U.S. Appl. No. 16/264,875 (pp. 1-8).
Notice of Allowance dated Jan. 7, 2021 for U.S. Appl. No. 16/264,875 (pp. 1-7).
Australian Examination Report No. 1 for App. No. AU2020204407, dated Mar. 23, 2021, 4 pages.
Eddystone format, https://developers.google.com/beacons/eddystone, printed Feb. 3, 2021, 9 pages.
Notice of Allowance dated May 26, 2021 for U.S. Appl. No. 16/586,246 (pp. 1-5).

* cited by examiner

| # | Symbol | Name | Currency Type | Transaction Rules | Balance |
|---|---|---|---|---|---|
| 1 | $ | US Dollars | Direct Hard Currency | 1% of all increases in balance to be diverted to balance #19 | 1238.23 |
| 2 | £ | British Pounds | Direct Hard Currency | N/A | 0 |
| 3 | € | Euros | Direct Hard Currency | N/A | 0 |
| 4 | | Promotional Credits | Indirect Hard Currency | -20/week from last casino visit | 50 |
| 5 | | Marketing Credits | Indirect Hard Currency | N/A | 20 |
| 6 | | Redeemables | Indirect Hard Currency | N/A | A.2/B.0/C.4/D.8 |
| 7 | | BevBucks | Indirect Hard Currency | Only usable at vendors X, Y, and Z | 15.5 |
| 8 | | GrubBucks | Indirect Hard Currency | Only usable at vendors Q, R, S, and T | 32 |
| 9 | | Aristocash | Soft Currency | N/A | 32488 |
| 10 | ฿ | Bitcoin | Non-National Digital Currency | N/A | 2 |
| 11 | Ξ | Ether | Non-National Digital Currency | N/A | 0 |
| 12 | | Loyalty Points | Loyalty Program Currency | +100/each day casino visited | 120020 |
| 13 | | Time - Game A | Time-based Currency | -60/week; resets to zero if time-based bonus activates in Game A | 402 |
| 14 | | Time - Game B | Time-based Currency | -10/week; resets to zero if time-based bonus activates in Game B | 112 |
| 15 | | Time - Game C | Time-based Currency | Resets to zero if not updated within last week or if time-based bonus activates in Game C | 0 |
| 16 | | Game State - Game D | Game Progression Currency | Resets if game progression reaches predetermined state | 4 |
| 17 | | Game State - Game E | Game Progression Currency | N/A | 2 |
| 18 | | Game State - Game F | Game Progression Currency | N/A | 0 |
| 19 | | Karmabucks ($) | Social Responsibility Currency | +1 for each 100 ($), 50 (£), or 100 (€) spent at casino | 145 |
| 20 | | Luck | Informational Currency | N/A | 12 |

Figure 4

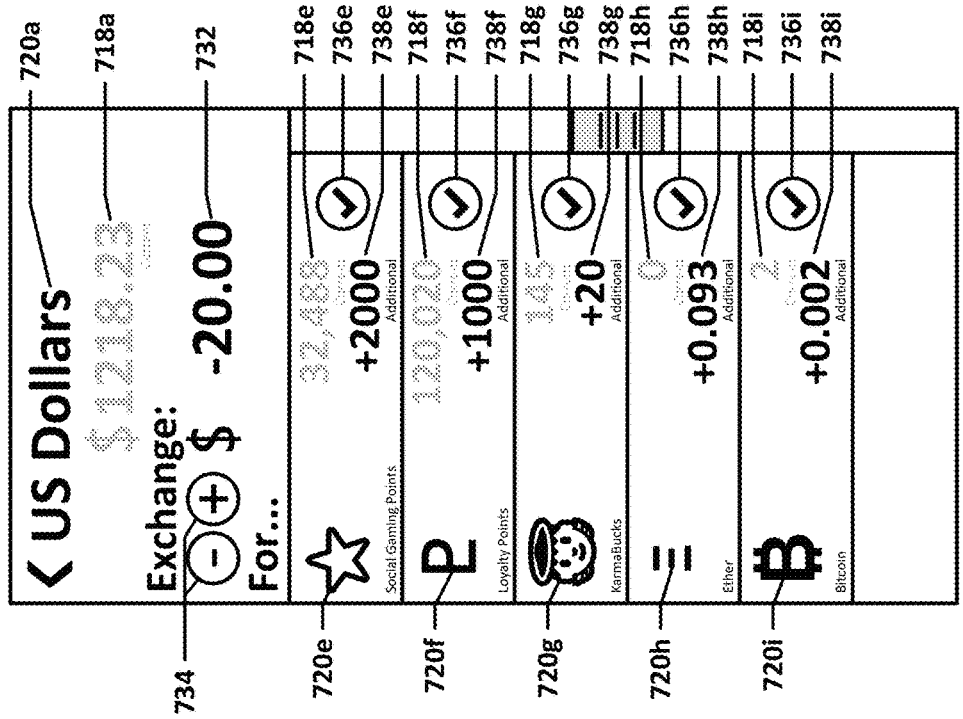
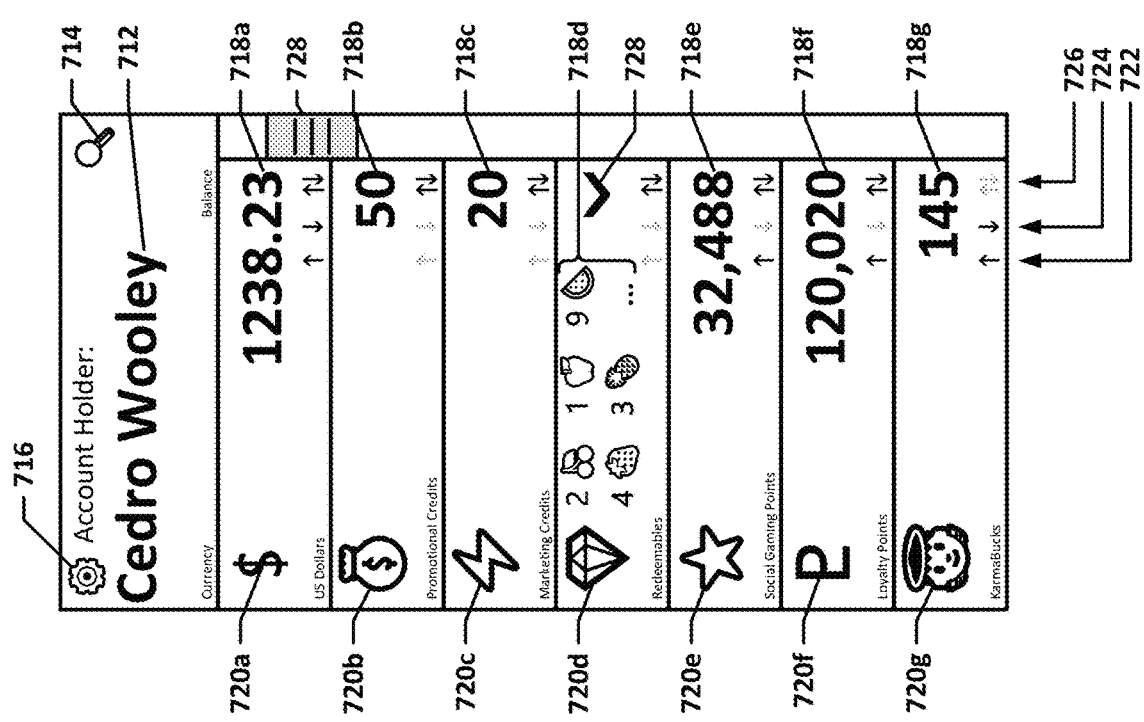
Figure 8
Figure 7

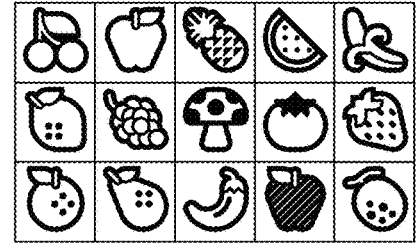
Figure 16
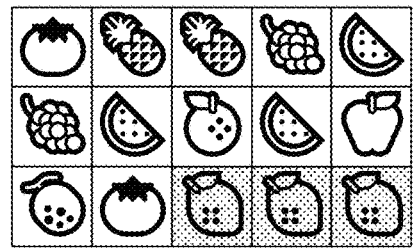
Figure 17
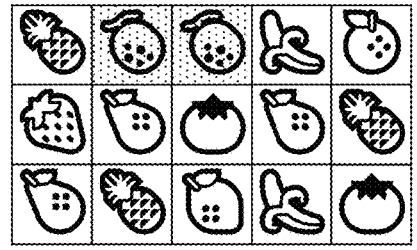
Figure 18
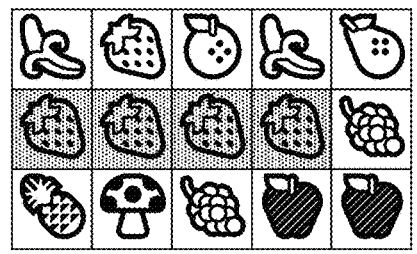
Figure 19
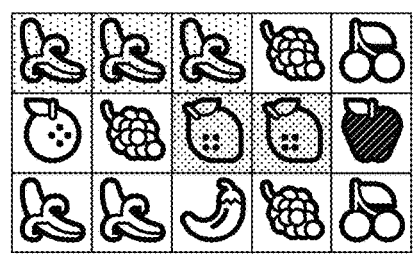
Figure 20
Figure 15

MULTI-CURRENCY DIGITAL WALLETS AND GAMING ARCHITECTURES

RELATED APPLICATIONS

This application claims benefit of priority under 35 U.S.C. § 119(e) to U.S. Patent Application No. 62/894,102, filed Aug. 30, 2019, and titled "MULTI-CURRENCY DIGITAL WALLETS AND GAMING ARCHITECTURES," which is hereby incorporated herein by reference in its entirety and for all purposes. This application is also related to U.S. patent application Ser. No. 16/585,838, filed Sep. 27, 2019, and titled "SYSTEM AND METHOD FOR MANAGING DIGITAL WALLETS," which is also hereby incorporated herein by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning results are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the results of the game. The display typically highlights winning combinations/results for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome; such symbol arrays may, in some instances, include one or more winning results, e.g., patterns of symbols that correspond to a winning event. Notably, some games may include an element of skill on the part of the player and are therefore not entirely random.

SUMMARY

Disclosed herein are various concepts relating to implementations of multi-currency wallets for wagering game players, as well as electronic gaming systems that may allow for multi-currency wagering game play.

Digital wallets, and systems for the management thereof, such as are disclosed herein may be configured to store information relating to player transactions for a variety of different currencies, including, in some implementations, unconventional forms of currency. Such currencies may include, for example, direct hard currencies, indirect hard currencies, soft currencies, indirect hard currencies, non-national digital currencies, loyalty program currencies, time-based currencies, game progression currencies, social responsibility currencies, and/or informational currencies. A multi-currency digital wallet implemented according to the present disclosure may store information relating to transactions in two or more such currencies engaged in by a user associated with the multi-currency digital wallet. For example, such a multi-currency digital wallet may store information regarding balances in various types of currencies that are associated with a user associated with that multi-currency digital wallet; such balances may be adjusted upwards or downwards as units of those currencies are received or expended by the user or otherwise adjusted. The systems for managing such multi-currency digital wallets may be configured to apply one or more transaction rules to each transaction for a user involving a currency amount stored in a multi-currency digital wallet for that user. Such transaction rules may, for example, take a variety of forms, such as exchange rate transaction rules that allow the user to change one type of currency into another, allocation transaction rules that allow the user to specify how units of a particular currency type (or how units of currency generally) are to be allocated, and so forth.

In some implementations, electronic gaming machine systems (or server systems that may provide similar functionality) may provide wagering games that may be specially configured to track payout amounts in multiple currencies for wagering game play; such EGM systems may be configured to interface with a player's multi-currency digital wallet in order to transfer funds (or the equivalent thereof in the currencies used) to and/or from accounts associated with the player and the EGM. Such EGM systems may, for example, utilize two separate paytables, each associated with a different currency, and may then match results achieved during play of the EGM with winning results defined by each such paytable. Thus, for example, a particular wagering game outcome may define a winning result in one currency's paytable but not the other currency's paytable, or vice-versa. In another example, a single outcome may define different winning results in the paytables of both currencies. In yet another example, a single outcome may define a common winning result that is in the paytables of both currencies.

In some implementations, group multi-currency digital wallets may be provided by the multi-currency digital wallet management systems discussed herein. Such group multi-currency digital wallets may allow users of individual multi-currency digital wallets to, in effect, share resources, winnings, and losses according to various rules. For example, a group multi-currency digital wallet may be set up for a team of players, and each player on the team may link their respective individual multi-currency digital wallet to the team's group multi-currency digital wallet. Each player may, via their individual multi-currency digital wallet, cause initial amounts of one or more currencies to be contributed to the group multi-currency digital wallet, and the group multi-currency digital wallet may then be configured, using various player rules, to allocate an amount or amounts of at least one such currency to one or more players that are on the team. Further rules may be used to determine how winnings that originate from the use of team funds are allocated between the team players.

In some implementations, a system may be provided that includes one or more processors, one or more memory devices, and one or more displays. The one or more memory devices, the one or more processors, and the one or more displays may be communicatively connected, and the one or more memory devices may store computer-executable instructions for controlling the one or more processors to obtain first paytable information that defines one or more payout amounts associated with a first currency for a first set of one or more results obtainable in a wagering game, obtain second paytable information that defines one or more payout amounts associated with a second currency for a second set of one or more results obtainable in the wagering game, wherein the first currency and the second currency are different, and present the wagering game using at least one of the one or more displays. The instructions may further include instructions for controlling the one or more processors to receive one or more inputs, cause a first wager to be placed in the wagering game using credits associated with at least the first currency responsive to receipt of the one or more inputs, determine an outcome of the wagering game in association with the first wager, the outcome defining one or more first results, and determine, for each first result that has at least one corresponding non-zero payout amount defined by the first paytable information or the second paytable information, at least one payout amount based on that first result and at least one of the first paytable information and the second paytable information.

In some implementations, the one or more memory devices may further store computer-executable instructions for further controlling the one or more processors to receive information indicating a transfer of a first currency amount of a first currency from a multi-currency digital wallet to an electronic gaming machine having the one or more displays, adjust a first meter associated with the first currency by a first credit amount based on the first currency amount, increment, for each first result that has at least one corresponding non-zero payout amount defined by the first paytable, the first meter based on that corresponding non-zero payout amount, and increment, for each first result that has at least one corresponding non-zero payout amount defined by the second paytable, a second meter based on that corresponding non-zero payout amount, wherein the second meter is associated with the second currency.

In some further such implementations, the one or more memory devices may further store computer-executable instructions for further controlling the one or more processors to receive information indicating a transfer of a second currency amount of a second currency from the multi-currency digital wallet to the electronic gaming machine and adjust the second meter associated with the second currency by a second credit amount based on the second currency amount.

In some alternative or additional such implementations, the one or more memory devices may further store computer-executable instructions for further controlling the one or more processors to receive input indicating a cashout request; cause, responsive to receipt of the input indicating the cashout request, a transfer of an adjusted first currency amount from the electronic gaming machine to the multi-currency digital wallet (where the adjusted first currency amount may be based, at least in part, on credits indicated by the first meter at the time the input indicating the cashout request is received); and cause, responsive to receipt of the input indicating the cashout request, a transfer of an adjusted second currency amount from the electronic gaming machine to the multi-currency digital wallet (where the adjusted second currency amount may be based, at least in part, on credits indicated by the second meter at the time the input indicating the cashout request is received).

In some implementations, at least one of the first currency and the second currency may be a direct hard currency, an indirect hard currency, a soft currency, a time-based currency, a game progression currency, an informational currency, a variable currency, a social responsibility currency, or a non-national digital currency.

In some implementations, there may be at least one result in the first set of results and the second set of results that has both a corresponding non-zero payout amount in the first currency and a corresponding non-zero payout amount in the second currency.

In some implementations, there may be at least one result in the first set of results and the second set of results that has both a corresponding non-zero payout amount in the first currency and a non-equivalent corresponding non-zero payout amount in the second currency.

In some implementations, the one or more memory devices may further store computer-executable instructions for further controlling the one or more processors to cause the one or more displays to indicate each first result that has a corresponding non-zero payout amount in the first currency using a first graphical effect, and cause the one or more displays to indicate each first result that has a corresponding non-zero payout amount in the second currency using a second graphical effect, wherein the first graphical effect and the second graphical effect are different.

In some such implementations, the one or more memory devices may further store computer-executable instructions for further controlling the one or more processors to cause the one or more displays to indicate the first result using the first graphical result and the second graphical result at different times for each first outcome that has both a corresponding non-zero payout amount in the first currency and a corresponding non-zero payout amount in the second currency.

In some implementations, the first set of results may include at least one result that is not included in the second set of results.

In some further such implementations, the second set of results may include at least one result that is not included in the first set of results.

In some implementations, a system may be provided that includes one or more processors and one or more memory devices. The one or more memory devices and the one or more processors may be communicatively connected and the one or more memory devices may store computer-executable instructions for controlling the one or more processors to: store, for each user of a plurality of users, data relating to quantities of currencies associated with that user, wherein the quantities of currencies associated with each user include at least two different currencies; store one or more transaction rules governing transactions that cause a change in the amount of at least one of the quantities of currencies associated with at least one of the users; and adjust the amount of at least one of the quantities of currencies associated with a first user of the users based on at least one transaction rule of the one or more transaction rules and responsive to one or more inputs.

In some implementations, at least two of the multiple different currencies may be different types of currency such as a direct hard currency, an indirect hard currency, a soft currency, a time-based currency, a game progression currency, an informational currency, a variable currency, a social responsibility currency, or a non-national digital currency.

In some implementations, a first currency of the currencies may be a direct hard currency backed by a national government.

In some implementations, a first currency of the currencies may be an indirect hard currency that is usable in place of a direct hard currency in various predetermined contexts.

In some implementations, a first currency of the currencies may be a soft currency that is usable in a virtual wagering game environment.

In some implementations, a first currency of the currencies may be a time-based currency, and the amount of the first currency for each user may be based on an amount of time spent by that user playing one or more predetermined wagering games.

In some implementations, a first currency of the currencies may be a game progression currency, and the amount of the first currency for each user may be based on a game state achieved in a predetermined wagering game by that user.

In some implementations, a first currency of the currencies may be a non-national digital currency.

In some implementations, a first currency of the currencies may be an informational currency.

In some implementations, a first currency of the currencies may be a social responsibility currency.

In some implementations, the one or more transaction rules may include at least one transaction rule that defines an exchange rate for converting a first amount of a first currency of the different currencies into a second amount of a second currency of the different currencies (where the first currency is different from the second currency) and causes the quantity of the first currency associated with a first user of the users to be decreased by the first amount and the quantity of the second currency associated with the first user to be increased by the second amount of the second currency.

In some implementations, the one or more memory devices may store computer-executable instructions for controlling the one or more processors to receive a first request identifying a first entity from a remote device, determine, responsive to receiving the first request, a first subset of one or more currencies of the currencies that are usable with the first entity for the purposes of making a first purchase, and provide information indicating the first subset of one or more currencies of the currencies to the remote device.

In some implementations, the one or more memory devices may store computer-executable instructions for controlling the one or more processors to receive a second request identifying a second entity from the remote device, determine, responsive to receiving the second request, a second subset of one or more currencies of the currencies that are usable with the second entity for the purposes of making a second purchase, and provide information indicating the second subset of one or more currencies of the currencies to the remote device, wherein the second subset includes at least one currency that is not included in the first subset.

In some implementations, the one or more memory devices may store computer-executable instructions for controlling the one or more processors to receive a first request from a remote device associated with a first user identifying a first entity and a first desired purchase, determine, responsive to receiving the first request, a first subset of one or more currencies of the currencies that are usable with the first entity for the purposes of making the first desired purchase, determine, for each currency in the first subset of one or more currencies, a corresponding amount of that currency that will be accepted by the first entity for the purpose of making the first desired purchase, and provide, to the remote device, information indicating the corresponding amount of each currency that has been determined as being accepted by the first entity for the purpose of making the first desired purchase.

In some implementations, the one or more memory devices may store computer-executable instructions for controlling the one or more processors to receive, from the remote device, information indicative of a selection of a first currency in the first subset of one or more currencies, and cause the data relating to the quantity of the first currency associated with the first user to be decremented by the corresponding amount for the first currency.

In some implementations, a system may be provided that includes one or more processors and one or more memory devices. The one or more memory devices and the one or more processors may be communicatively connected, and the one or more memory devices may store computer-executable instructions for controlling the one or more processors to store, for each digital wallet of a plurality of digital wallets, data relating to one or more quantities of one or more currencies associated with that digital wallet, wherein the plurality of digital wallets includes a first plurality of user digital wallets and a second plurality of group digital wallets; store, for each of the user digital wallets, first information associating that user digital wallet with a corresponding user, wherein the users associated with the user digital wallets are all different users; store, for each of the group digital wallets, second information associating that group digital wallet with two or more of the users associated with the user digital wallets; store one or more transaction rules governing transactions that cause a change in the quantity of at least one of the one or more currencies associated with at least one of the digital wallets; and adjust the quantity of at least one of the one or more currencies associated with one of the digital wallets based on at least one transaction rule of the one or more transaction rules responsive to one or more inputs.

In some implementations, the one or more memory devices may store further computer-executable instructions for controlling the one or more processors to receive instructions to associate a first set of one or more of the users associated with the user digital wallets with a first group digital wallet of the group digital wallets and update the second information for the first group digital wallet to associate the first group digital wallet with the users in the first set of one or more users.

In some implementations, the one or more memory devices may store further computer-executable instructions for controlling the one or more processors to receive a first transaction request associated with a first user digital wallet of the user digital wallets, the first transaction request specifying a first amount to be transferred from a first quantity of the one or more quantities of one or more currencies associated with the first digital wallet to a second quantity of currency of the one or more quantities of one or more currencies that is associated with a first group wallet of the group wallets; cause the first quantity to be decremented by the first amount responsive to receiving the first transaction request; and cause the second quantity to be incremented according to the first amount.

In some implementations, the one or more memory devices may store further computer-executable instructions for controlling the one or more processors to store one or more group transaction rules, each group transaction rule limiting, for at least a first user of the users associated with a first group digital wallet of the group digital wallets, one or more items such as: an ability of the first user to engage in transactions using a portion of at least one of the one or more quantities of one or more currencies associated with the first group digital wallet, a type of transaction that the first user is permitted to engage in using a portion of at least one of the one or more quantities of one or more currencies associated with the first group digital wallet, an entity with which the first user may engage in a transaction using a portion of at least one of the one or more quantities of one or more currencies associated with the first group digital wallet, an ability of the first user to transfer an amount of one of the one or more quantities of the one or more currencies associated with the first group digital wallet to a first user digital wallet associated with the first user, and an ability of the first user to exchange a first amount of one of the one or more quantities of the one or more currencies for a second amount of another currency that is added to one of the other quantities of one or more currencies.

These and other aspects of multi-currency digital wallets and multi-currency gaming systems are discussed below in more detail; the above discussion is not intended to be limiting.

BRIEF DESCRIPTION OF THE DRAWINGS

FIG. 4 depicts an example multi-currency digital wallet data structure.

FIG. 7 depicts an example GUI for a multi-currency digital wallet that provides a snapshot of the currency balances tracked by the multi-currency digital wallet.

FIG. 8 depicts a GUI that allows a user to engage in a currency exchange transaction within a multi-currency digital wallet.

FIG. 15 depicts two example multi-currency pay tables.

FIG. 16 shows a reel display for a 5-reel slot-machine-type wagering game, as well as various symbols that may be present on each reel.

FIG. 17 shows a game outcome that includes a winning result for currency A in the paytables of FIG. 15.

FIG. 18 shows a game outcome that includes a winning result for currency B in the paytables of FIG. 15.

FIG. 19 shows a game outcome that includes a winning result for both currencies A and B in the paytables of FIG. 15.

FIG. 20 shows a game outcome that includes winning results for both currencies A and B in the paytables of FIG. 15.

FIG. 23 depicts a GUI for a multi-currency wagering game.

FIGS. 24 and 25 depict the wagering game GUI of FIG. 23, but with different graphical effects applied to highlight the winning result for different currencies.

DETAILED DESCRIPTION

Figure 1:
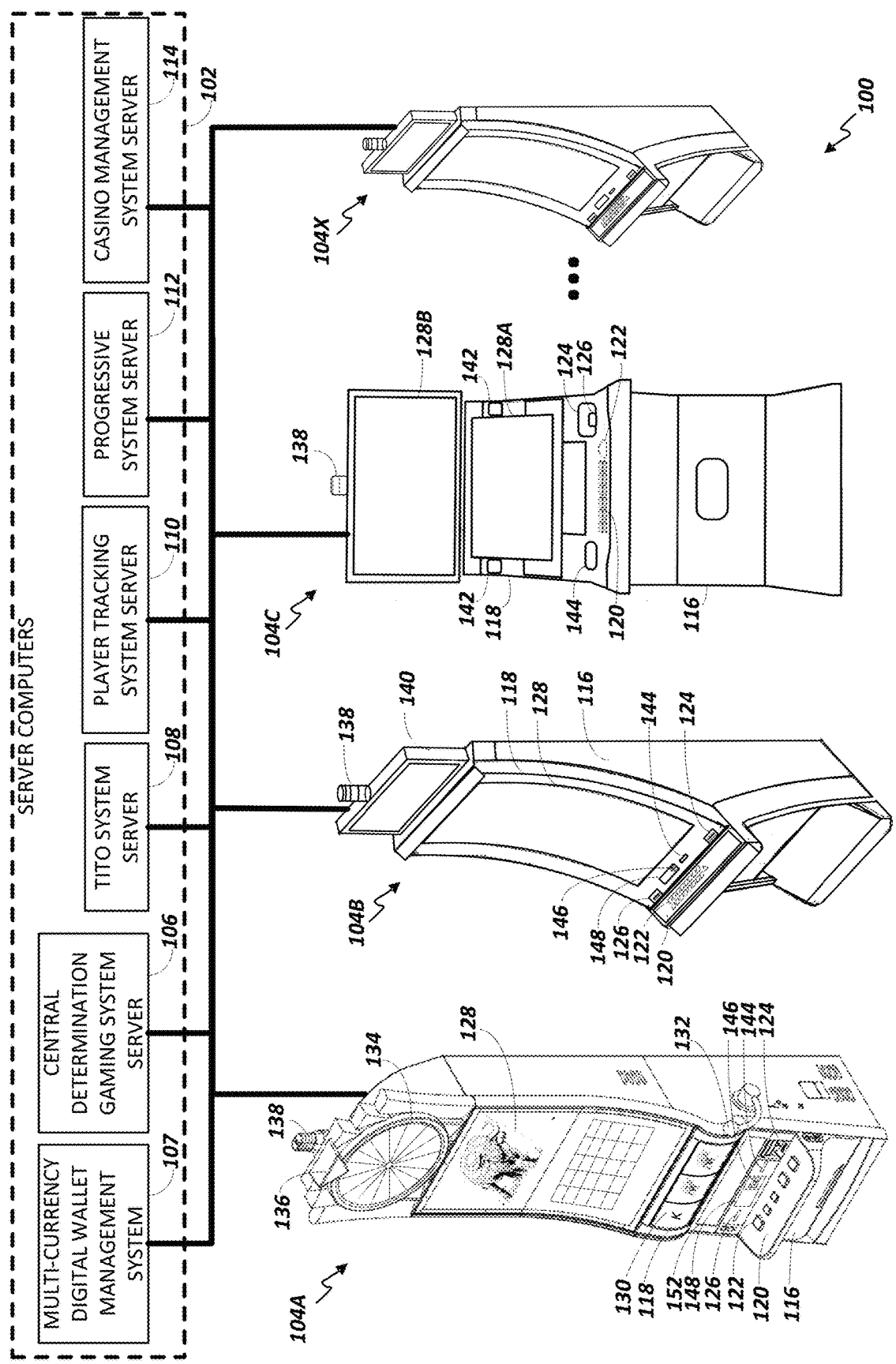
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players. The server computers 102 may also include a multi-currency digital wallet management system 107, as discussed further below, that may be used to provide for management of multi-currency digital wallets. In some additional or alternative implementations, the multi-currency digital wallet management system 107 may be a digital wallet management system that is configured to manage group digital wallets and individual digital wallets, even if such wallets are not multi-currency digital wallets (system 107 may, in such cases, simply be referred to as a digital wallet management system or group digital wallet management system). The multi-currency digital wallet management system may communicate with, for example, the gaming devices 104, or other devices or entities, such as smartphones of users associated with digital wallets or devices associated with merchants or service providers, for the purposes of completing various transactions involving such digital wallets.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine results for the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular result or set of results in the primary game), bonus topper wheel 134 is operative to spin and stop with indicator arrow 136 indicating the result of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
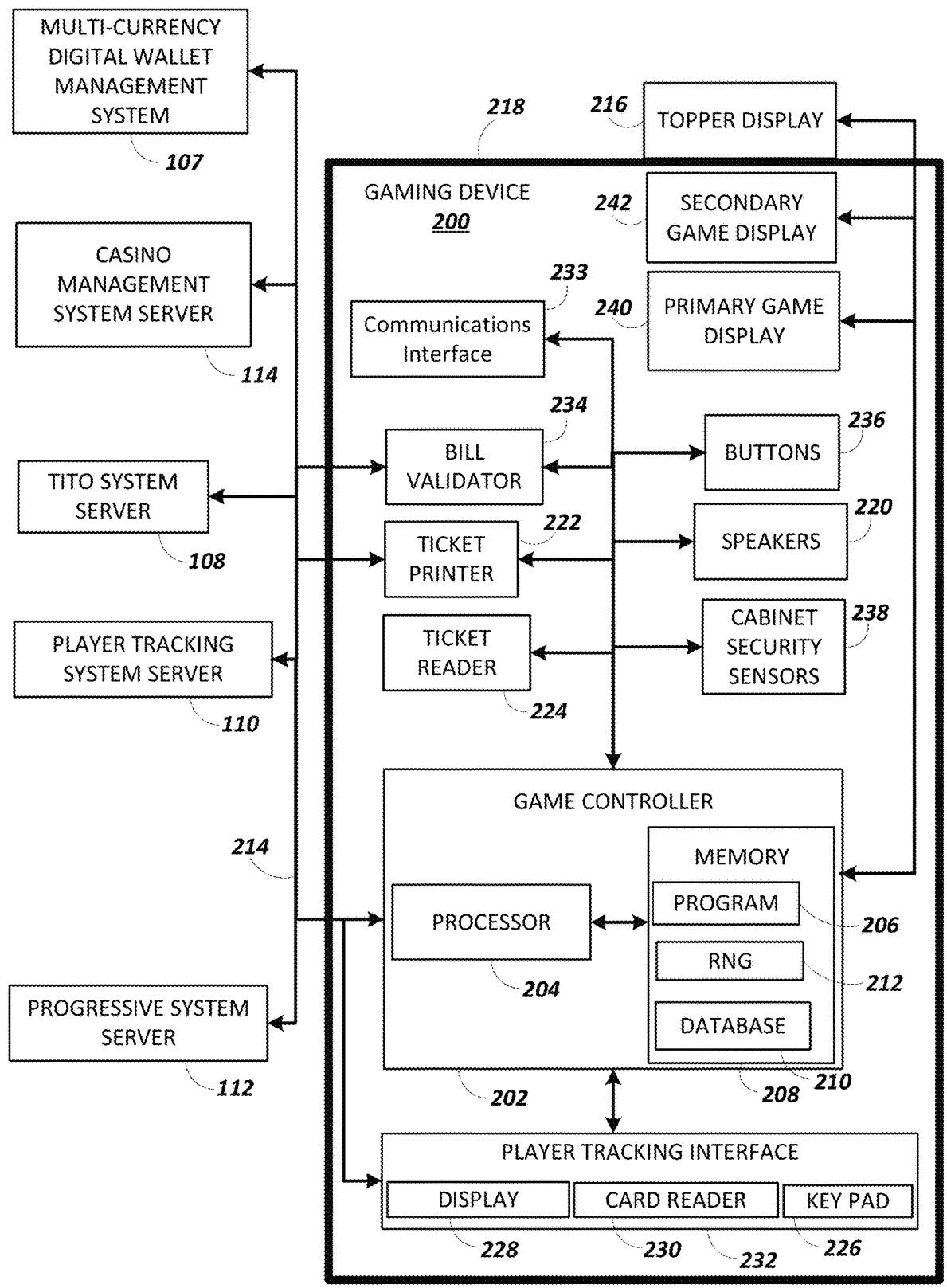
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc' model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide new technology in that they provide mechanisms for allowing wagering game players to centrally manage amounts of a variety of different currencies to facilitate the efficient use of such resources and/or allow wagering games to be presented that utilize multiple paytables, each corresponding with a different currency, thereby providing players with increased opportunities for experiencing winning events. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming device 200 may also be connected over network 214 with a multi-currency digital wallet management system 107, which may be configured to provide functionality for multi-currency digital wallets, as discussed in more detail later in this application. Alternatively or additionally, the gaming device 200 may be connected over network 214 with a system 107 that may provide for group or individual digital wallet management, regardless of whether for multi-currency digital wallets. Gaming device 200 may also include a communications interface 233, e.g., a wireless communications interface, that may be used by the gaming device 200 to communicate with a player's smartphone, for example, to facilitate digital wallet transactions. For example, a gaming device 200 may include a Bluetooth beacon, an radio-frequency identification (RFID) tag or near-field communication (NFC) tag that may wirelessly communicate with a player's smartphone to facilitate digital wallet transactions. In some implementations, the smartphone may communicate directly with the gaming device to established transaction details, and then one or the other, or both, of the smartphone and the gaming device 200 may communicate with the digital wallet management system 107 to initiate the transaction negotiated between the gaming device 200 and the smartphone. Alternatively, there may only be relatively passive communication between the gaming device 200 and the smartphone, e.g., the smartphone may read a unique identifier from an NFC tag mounted to the gaming device 200, and may then request via a cellular data/internet connection, for example, that the digital wallet management system 107 initiate a transaction with the entity or device associated with the NFC's tag's unique identifier, e.g., with the gaming device 201, at which point the digital wallet management system 107 may match the unique identifier to the gaming device 200 from a list of unique identifiers and merchants, gaming devices, etc., associated therewith, contact the gaming device 200 via, for example, the network connection 214, and manage a transaction between the smartphone and the gaming device 201.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the results of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Most EGMs and wagering game systems are designed to be single-currency, e.g., they typically only accept a single type of currency for play, and provide winnings in a single type of currency. In some instances, an electronic gaming machine may accept or provide, for example, vouchers for promotional credits, vouchers for free drinks or meals, etc., in response to one or more conditions being met, e.g., achieving a particular result in a wagering game. Additionally, players may receive loyalty points or similar assets as a result of player actions or other triggering events when playing electronic gaming machines. All of these different transactions involving different types of "currency" are typically handled through different accounting mechanisms or systems, requiring the player to keep multiple different instruments on hand—for example, the player may need to keep cash or a credit or debit card on hand in order to provide hard currency funds to an EGM, physical voucher printouts for promotional credits and/or meals or drinks, and/or a player tracking card to log in to a player tracking system in order to track loyalty points.

A multi-currency digital wallet, as discussed herein, may be used to consolidate information about a plurality of balances in a variety of different currencies for a single player. Such multi-currency digital wallet information may be stored and managed in a variety of different ways, but, regardless of how it is stored and managed, may be generally accessible to the player for use with any system or establishment that is configured to interface with the multi-currency digital wallet management system. Thus, a player may use a multi-currency digital wallet to engage in transactions with a given entity using any of the currencies that are tracked by the player's multi-currency digital wallet and that are accepted by that entity; after such a transaction, the player's multi-currency digital wallet may be updated to reflect, for example, a changed balance for a particular currency due to the transfer of an amount of that currency to another entity. The player may also use their multi-currency digital wallet to receive funds (or equivalents) from entities in one or more currencies tracked by the multi-currency digital wallet. Thus, the multi-currency digital wallet may provide a single, unified architecture that may be used to provide a player with the ability to easily conduct transactions in any of a variety of currencies. Since such an architecture may track and manage balances for a player in a variety of such currencies, the architecture may additionally facilitate the ability to provide a player with a global view of the various assets that they control and that may be available to them for use in a variety of contexts. In some implementations, the same architecture may include various transaction rules that may be applied to transactions that a player engages in with their multi-currency digital wallet.

The various currencies for which balances may be tracked via a multi-currency digital wallet may include, for example, direct hard currencies, indirect hard currencies, soft currencies, time-based currencies, game progression currencies, non-national digital currencies, informational currencies, loyalty program currencies, and social responsibility currencies.

Direct hard currencies are currencies that are, in a practical sense, usable as cash, e.g., currencies that are directly fungible for a currency that is backed by a national government, e.g., United States dollars, European Euros, Japanese yen, etc. In some implementations, a multi-currency digital wallet may track one or more such hard direct currencies.

Indirect hard currencies are currencies that may generally be usable as a hard currency but are not directly fungible for the corresponding hard currency. For example, a casino may issue a player a predetermined amount of "marketing dollars" that may be used to make wagers in US dollars on a wagering game that uses dollars as its currency; if the player makes a wager with such marketing dollars and wins an amount of credits based on such a wager, the winnings may be cashable by the player for US dollars, i.e., a direct hard currency. Thus, indirect hard currency may be used as hard currency in one or more contexts, e.g., in a wagering game or a particular type of wagering game, in one or more particular businesses, to exchange for an amount or amounts of one or more predetermined types of other currencies, etc., but must be transformed into direct hard currency through some sort of intermediate activity before being able to be freely used as cash. Indirect hard currency is not directly exchangeable into direct hard currency, e.g., one cannot directly exchange $1 of indirect hard currency with $1 of direct hard currency—however, one could wager the $1 of indirect hard currency, win $1 based on the wager, and then cash out the $1 of winnings for $1 of direct hard currency. Other types of indirect hard currencies may include, for example, promotional credits and symbolic awards. Symbolic awards, for example, may include virtual trophies, baubles, gems, etc., that represent an amount of a more directly analogous indirect hard currency. For example, a player may be awarded with symbolic awards of diamonds through playing a wagering game—each such diamond that the player wins may be directly exchangeable by the player for $5 of promotional credits or marketing dollars. Those marketing dollars or promotional credits would then need to be converted to direct hard currency, for example, through some sort of intermediate activity. In multi-currency digital wallets that track symbolic awards, such multi-currency digital wallets may track each type of such symbolic awards that a player has received.

Soft currencies are currencies that may be used for virtual play of wagering games but which are not able to be exchanged for direct hard currency (although direct hard currency can be, and often is, exchangeable for soft currency). Soft currencies are typically used for social online wagering game play in order to comply, for example, with restrictions on internet gambling that prohibit real-money wagering in many jurisdictions. Soft currencies also have a further appeal in the context of social online wagering game play, which is that there is far more flexibility in setting exchange rates for soft currencies than with hard currencies (both direct and indirect). For example, soft currencies may have exchange rates that inflate the number of soft currency credits that players get for a given amount of hard currency that is exchanged for the soft currency credits—thus, $1 of hard currency may gain a player 100 units of a soft currency. Players may thus be able to more easily place large-denomination wagers and experience the potential excitement of obtaining a "big win" than they would in normal wagering game play.

Time-based currencies and game progression currencies may be similar in some respects, although the differences between them will become apparent from the discussion below. Both time-based and game progression currencies recognize that a player's time is a commodity that the player invests in playing wagering games, and some implementations of multi-currency digital wallets may be configured to track such time investments. For time-based currencies, the amount of time a player spends playing one or more types of wagering games may be tracked and saved for later use. For example, a particular type of wagering game may offer time-based bonuses or other time-based activation of certain features, e.g., a bonus multiplier may be activated for a limited duration after the player has played a particular wagering game for 60 minutes. With some implementations of a multi-currency digital wallet as discussed herein, the player's accrued play time on the wagering game may be stored in the player's multi-currency digital wallet as another form of currency. When the player next engages in a play session of that same wagering game (either on the same EGM or on another EGM offering the same wagering game for play), the accrued balance of the player's time for that wagering game may, in effect, be transferred to the EGM, thereby causing the player's accrued play time to start at the value of the transferred play time balance rather than at zero. For example, if a player accrued 40 minutes of play time on a wagering game, but then had to leave to get in line for a wagering game tournament that they were participating in, the player's 40 minutes of accrued time would be wasted in most cases. However, if the player was able to transfer that balance of accrued time to their multi-currency digital wallet, the player could, after completing their tournament game play, return to playing the wagering game that they were playing immediately before participating in the tournament—by transferring the balance of their accrued time for that wagering game to the EGM on which they decide to play, they would be able to start play in the same position they were in, with respect to any time-based features, prior to leaving their prior play session in order to participate in the tournament. It will be appreciated that a multi-currency digital wallet may store a large variety of different time-based currencies in some implementations. For example, a multi-currency digital wallet may, in some instances, be configured to store corresponding balance amounts for time-based currencies for a plurality of different wagering games, with each time-based currency balance being transferrable to and from the wagering game corresponding thereto. In some additional or alternative implementations, the multi-currency digital wallet may store more generic time-based currencies, e.g., time-based currencies that may reflect the balance of time the player has spent playing any of a plurality of wagering games, even if of different types. For example, a player might accrue time-based awards for engaging in a certain amount of play on EGMs meeting certain criteria, e.g., any EGMs located at a particular casino property, any EGMs made by a common manufacturer, any EGMs featuring particular classes of wagering games (such as class II v. class III), any EGMs featuring particular common thematic elements, e.g., EGMs with wagering games providing poker-like play, wild-west themes, or an Asiatic theme. In such implementations, a corresponding balance may be established in the multi-currency digital wallet for each such time-based currency that is to be tracked for the player with which that multi-currency digital wallet is associated; any particular balance thereof may then be updated as the player accrues further play time in any of the wagering game types that is associated therewith.

Game progression currencies may function somewhat like time-based currencies, but may store a game state for a particular wagering game (regardless of the time spent to achieve it) rather than an amount of time elapsed playing that particular wagering game. For example, some wagering games may have special features or modes that may be unlocked if the player attains a particular set of results while playing the wager game. For example, a reel-based EGM having a playing-card theme may activate a special bonus mode once the player has obtained reel patterns of a straight flush in each of the four suits of cards in a playing deck. The player may have obtained reel patterns for straight flushes for hearts, spades, and clubs, but may be missing a straight flush of diamonds at the time that they conclude their wagering game session on the EGM. The player's progression in the wagering game at the conclusion of their play session, may be stored in the player's multi-currency digital wallet, e.g., the multi-currency digital wallet may store game state information indicating that the player achieved the straight flushes for hearts, spades, and clubs; such information may be thought of as "game progression currency." When the player next plays that wagering game, the player's game state for the wagering game may be loaded into the EGM from the multi-currency digital wallet, and the player may then start play in the same game state that they were in, with respect to the relevant game-state dependent feature, at the conclusion of their most recent play session of that wagering game. The game state information thus acts as game progression currency, i.e., it is exchangeable in the context of that wagering game in return for a particular game state being activated in the wagering game. As with many time-based currencies, separate game progression currencies may be stored in a multi-currency digital wallet, with each game progression currency corresponding with a different wagering game (or features for different wagering games).

Non-national digital currencies may be any of a variety of "alternative" currencies that are commonly recognized as being in circulation, e.g., Bitcoin, Ether, Litecoin, Ripple, etc. Such currencies are typically readily exchangeable for direct hard currency on secondary markets, but they are not backed by any national government and their exchange rates are typically highly volatile. Such currencies are often associated with block chain technology and/or cryptography, making them difficult or impossible to counterfeit or fake.

Informational currencies may be any of a variety of types of informational content regarding a player's behaviors. Such currencies may, for example, reflect a player's "luck" when playing wagering games, daily engagement with wagering games, attention, influencer scores, online to offline interaction ratio, etc.

Loyalty program currencies may be any of a variety of currencies that take the form of loyalty program points or similar indications of a player's rank within a player loyalty system. For example, many casinos provide a player loyalty system that provide players with certain benefits based on the player's rank or standing within the player loyalty system. Such rankings or standings may be determined based on a quantification of each player's "loyalty" to the casino (or a network of casino properties) in the form of loyalty points—the more loyalty points a player has, the higher their rank within the player loyalty system, and the more benefits they are likely to be eligible to receive. Such loyalty points may be earned by players based on a variety of actions, e.g., staying at a particular casino property, playing certain types of games, wagering a certain amount of money within a given period of time, etc.

Social responsibility currencies, which may also be referred to as corporate responsibility currency, may be any currency that is designated for donation to a charity or non-profit. Social responsibility currencies may be provided in any of the currency types discussed above, but are typically direct hard currency. While social responsibility currency balances can generally be freely added to through a variety of mechanisms, e.g., through player donations, winnings at EGMs, venue actions, etc., they are limited in how they can be disbursed. For example, social responsibility currencies may largely function as one-way accounts—a player may be allowed to freely add funds to a social responsibility currency balance, but may be restricted from exchanging any portion of a social responsibility currency for other currencies, or from using any portion of a social responsibility currency balance for any non-charity related purpose. In many implementations of a multi-currency digital wallet management system that tracks one or more social responsibility currency balances, the management system may only allow the player that is associated with a multi-currency digital wallet to have a limited ability to direct how portions of a social responsibility currency balance managed in the multi-currency digital wallet should be distributed; in some such systems, the player may have no ability to direct how portions of the social responsibility currency balance should be distributed. In some implementations, multi-currency digital wallet management systems may be configured to allow a player a limited ability to exchange or transfer portions of a social responsibility currency balance into another currency type or to another currency balance, e.g., a non-social responsibility currency balance. In such implementations, the player may be permitted, for example, to "undo" a transfer or exchange of funds into a social responsibility currency balance that they initiated or requested, but may not be allowed to transfer or exchange portions of a social responsibility currency balance that originated with or were caused by third parties, e.g., such a system would not permit a player to exchange or transfer portions of a social responsibility currency balance that are, for example, caused by a wagering game result, provided by a casino property as part of a promotional charity event, or otherwise caused by the actions of a third party.

As mentioned above, in many implementations that feature social responsibility currency or currencies, the multi-currency digital wallet management system may only allow the player that is associated with a multi-currency digital wallet to only have a limited ability to direct how portions of a social responsibility currency balance managed in the multi-currency digital wallet should be distributed. Thus, for example, a multi-currency digital wallet management system may be configured to reference a table of approved charitable organizations and allow the player to select between a subset of such approved charitable organizations to designate a recipient of a transfer of a portion of the social responsibility currency balance. Such a subset may be selected randomly by the multi-currency digital wallet management system, or may be selected according to various criteria or rules, e.g., during the Thanksgiving week, the multi-currency digital wallet management system may cause a player wishing to distribute some of their accrued social responsibility currency balance to be presented with a graphical user interface that allows the player to select one or more food-bank type charities as recipients for funds from the player's social responsibility currency balance. In another example, a casino may run a promotion during National Wildlife Week in which the multi-currency digital wallet management system may be configured to select charities that benefit or help animals as potential charitable giving targets for players wishing to transfer a portion of their social responsibility currency balance to a charity.

A multi-currency digital wallet for a player according to the present disclosure may be implemented in a number of ways, but will generally consist of one or more data structures, e.g., one or more database records, that are associated with information identifying the player and that at least track balances in a plurality of currencies for that player (the one or more data structures may track additional information as well, e.g., some multi-currency digital wallets may store information regarding every transaction performed using a multi-currency digital wallet, every transaction performed using a multi-currency digital wallet during a given timeframe, or the last X transactions performed using each multi-currency digital wallet). Some multi-currency digital wallets may allow for multiple balances of the same currency to be maintained, e.g., a multi-currency digital wallet for a player may track multiple balances that represent US dollars, thus allowing the player to, for example, segregate funds that may be intended to be used for different purposes. For example, a player may wish to allocate a balance of $2000 in a multi-currency digital wallet to pay for food and lodging during a vacation to a casino, and a separate balance of $1500 that is intended to be used for entertainment, e.g., shows, rides, etc., and $2500 that is intended to be used for wagering activities.

A multi-currency digital wallet according to the present disclosure may also, in some implementations, include one or more additional data structures, e.g., one or more database records, that store information defining one or more transaction rules that may be applied by the multi-currency digital wallet management system to affect the various currency balances that are managed using the multi-currency digital wallet. Some such transaction rules for a multi-currency digital wallet may, for example, be accessible to, and definable by, the player that is associated with that multi-currency digital wallet; such transaction rules may be referred to herein as player- or user-defined transaction rules. For example, a player may wish to define a transaction rule that automatically transfers 1% of all amounts of a particular currency or type of currency, e.g., 1% of all US dollars or 1% of all direct hard currency, that are credited to one or more balances tracked by the player's multi-currency digital wallet to a social responsibility balance managed by that multi-currency digital wallet. In another example, a player may define a rule that may designate a particular currency balance managed in the multi-currency digital wallet as a preferred currency to use in transactions with entities that accept payment in a variety of currency types (in a further such implementation, a player may rank two or more currency balances managed by their multi-currency digital wallet, and the highest-ranked currency balance of the ranked currency balances that is in a currency accepted by a particular entity may be automatically used for transactions (or may be selected as a default but then changeable by the player at the time of the transaction) with that entity.

Transaction rules may also include system transaction rules, which may be rules that are not able to be modified by the owner of a multi-currency digital wallet but can be modified by the manager of the multi-currency digital wallet management system. For example, a multi-currency digital wallet management system manager may establish various rules governing exchanges between currency types in a multi-currency digital wallet. For example, a manager of a multi-currency digital wallet management system may establish a system transaction rule that permits a player to exchange an amount of a first type of currency, e.g., US dollars, into another amount of a second type of currency, e.g., Euros, at a particular exchange rate. As exchange rates fluctuate, such a rule may be configured to periodically update the exchange rate used. In another example, a manager of a multi-currency digital wallet management system may configure a system transaction rule to cause an amount of a first currency to be credited to a balance for the first currency managed by a player's multi-currency digital wallet every time the player uses funds from the multi-currency digital wallet to make a purchase at a particular entity or entities, e.g., such a system transaction rule may cause a soft currency balance managed by the player's multi-currency digital wallet to be credited with an amount of that soft currency that is proportionate to an amount of hard currency, e.g., US dollars, that the player transfers from the multi-currency digital wallet to such an entity.

For clarity, a "multi-currency digital wallet system manager" or "multi-currency digital wallet management system manager" (which may also be referred to herein as simply a "system manager" or "manager") refers to the entity that may, ultimately, manage the operation of a multi-currency digital wallet management system.

A special class of transaction rules is temporal adjustment rules, which may act to modify one or more balances managed in a multi-currency digital wallet over time, either periodically or continuously. Such temporal adjustment rules may generally be considered system transaction rules, although temporal adjustment rules may, in some cases, be player-definable as well. Temporal adjustment rules may be used, for example, to perform time-based adjustments to one or more currency balances in a multi-currency digital wallet. For example, one form of a temporal adjustment rule would be a rule that, at various points in time, causes a multi-currency digital wallet management system to increase a particular currency balance by a certain amount according to a specified interest rate and the amount of that currency balance during an interval prior to the adjustment. Thus, for example, hard currency balances managed by a multi-currency digital wallet management system may be caused to earn interest. In such implementations, the amount added to a currency balance managed by a multi-currency digital wallet may be either simply added with no corresponding decrement in any other balance, regardless of location, or may be transferred to the currency balance from some other location, e.g., from another balance managed by the multi-currency digital wallet management system manager. For hard currency balances, the latter approach would be required since hard currency balances represent actual cashable assets, but for some other types of currency balances, e.g., soft currency balances, the manager may, in some cases, simply increase the currency balance without necessarily decrementing another balance by a corresponding amount (for example, if the manager controls the soft currency valuation, the manager may freely introduce additional such currency into the market without legal penalty.

In another example, a multi-currency digital wallet management system may include a temporal adjustment rule to cause a certain currency balance to decrease over time. For example, a temporal adjustment rule may be defined by a manager to cause a soft currency balance to slowly bleed off over time, e.g., X unit(s) of the soft currency, e.g., 5 units, may be removed from the balance for that soft currency in a player's multi-currency digital wallet every Y seconds, e.g., every 300 seconds. In a further example of a temporal adjustment rule, additional conditions may be evaluated before any adjustments are made, e.g., the temporal adjustment rule may only adjust the amount of the soft currency balance if no player-initiated transactions involving that soft currency balance have been performed in the last Z days, e.g., last three days. Such temporal adjustment rules may allow for certain balances managed in a multi-currency digital wallet to be "decayed" over time; this may allow a multi-currency digital wallet management system manager to, for example, reduce the total amount of some currencies that may be in circulation, e.g., reduce the amount of a soft currency controlled by the manager that is in circulation, or encourage spending of a particular type of currency, e.g., if the multi-currency digital wallet manager wishes to encourage additional spending of a particular type of soft currency. As with temporal adjustment rules that cause gains in one or more balances of a multi-currency digital wallet, temporal adjustment rules that cause decrements in one or more balances of a multi-currency digital wallet may, in some instances, simply cause a particular currency balance in a multi-currency digital wallet to decrease without causing any corresponding increment in a balance elsewhere, but may, in other instances, cause a particular currency balance in a multi-currency digital wallet to decrease by transferring a portion of that particular currency balance to another balance, either in the same multi-currency digital wallet or in another location (such a transfer may also involve the application of a currency exchange rate to the transferred amount in some instances). For example, a multi-currency digital wallet management system manager may establish a temporal adjustment rule that causes an indirect hard currency balance for a multi-currency digital wallet to slowly be transferred to a social responsibility currency balance within the same multi-currency digital wallet if the player associated with the multi-currency digital wallet does not engage in any transactions using that indirect hard currency balance for a predetermined period of time; such transfers of the indirect hard currency balance to the social responsibility currency balance may be subjected to adjustment via an applicable exchange rate. For example, the indirect hard currency may be in the form of promotional credits, which may be used interchangeably with US dollars when placing wagers on a wagering game but cannot be cashed out directly. If a player having an amount of such promotional credits indicated in a corresponding balance of their multi-currency digital wallet does not engage in any transactions involving that balance within a 3-day period, then a temporal adjustment rule may cause amounts of promotional credits to be debited from that promotional credit balance in the multi-currency digital wallet and transferred to a social responsibility currency balance within that same multi-currency digital wallet, e.g., 10 promotional credits may be debited from that promotional credit balance in the multi-currency digital wallet every hour and then transferred to the social responsibility currency balance for that multi-currency digital wallet. As part of such a transfer, an exchange rate may be applied by the multi-currency digital wallet, e.g., an exchange rate of 100 promotional credits/1 social responsibility credit may be applied, so each transfer of 10 promotional credits from the promotional credit balance to the social responsibility currency balance may result in a corresponding increase of only 0.1 in the social responsibility balance. The application of such an exchange rate may be used, for example, to account for potentially large variations in value between currencies. For example, while each promotional credit may be used equivalently with hard currency US dollars for the purposes of placing wagers, the actual value of each promotional credit may be less than one dollar since the only way to transform the promotional credit into US dollars would be to place a wager using the promotional credit. While each individual wager may have any of a variety of consequences, e.g., total loss, partial win (where the winnings are not zero but are also less than the wager), break-even win (where the winnings equal the wager), and outright win (where more than the wager is won), the average amount won may, for example, be 90% of the wager made. Thus, on average, each marketing credit may be viewed in this example as having a "real" worth in US dollars of about $0.90.

Another potential use for temporal adjustment rules is to allow for a time-based expiration of an amount of a currency. For example, an amount of player loyalty program currency may be awarded to a player based on the player satisfying one or more conditions. In conjunction with such an award, a temporal adjustment rule may be configured to cause that amount of player loyalty program currency to be set to zero some predetermined number of days, e.g., 10, 14, 21, etc., after the last time one or more conditions were met by that player, e.g., after the last time the player stayed at one or more designated casino properties, after the last time the player played a wagering game offered by one or more designated casino properties, or after the last time the player wagered a predetermined amount, e.g., $100, within a predetermined period of time on wagering games offered by one or more designated casino properties. Such a temporal adjustment rule would have the effect of causing that amount of player loyalty program currency to, in effect, expire if the recipient thereof does not patronize a property designated by the temporal adjustment rule with sufficient frequency, for example. The amount of such a player loyalty program currency award may, for example, be sufficiently high that it causes the receiving player to receive additional benefits based on the amount of player loyalty program points that they have than they would otherwise be entitled to. By using a temporal adjustment rule such as described above, however, the additional amount (and benefits) can be tied to continued patronage of the relevant casino properties—a "use it or lose it" scenario.

In another example, transaction rules may be provided that cause, for example, the value of a redeemable in a multi-currency digital wallet to be upgraded (or downgraded) over time and/or based on actions taken by the user associated with that multi-currency digital wallet. For example, a redeemable that may be exchangeable for $1 million credits of soft currency for social wagering game play may be caused to have its exchange value increased by some amount, e.g., a fixed amount or a percentage, in response to the user associated with that multi-currency digital wallet using direct hard currency to play wagering games in a casino for some period of time and/or some number of times (or wagering a certain total amount of direct hard currency on such wagering games). Some such transaction rules may be configured to be implemented in an ongoing manner, e.g., as long as the user is engaging in one or more predetermined activities, such transaction rules may continuously (or on some regular, periodic basis) cause changes in a balance of a currency in a multi-currency digital wallet and/or a change in the value of a unit of a currency, e.g., a redeemable, in the multi-currency digital wallet.

Figure 3:
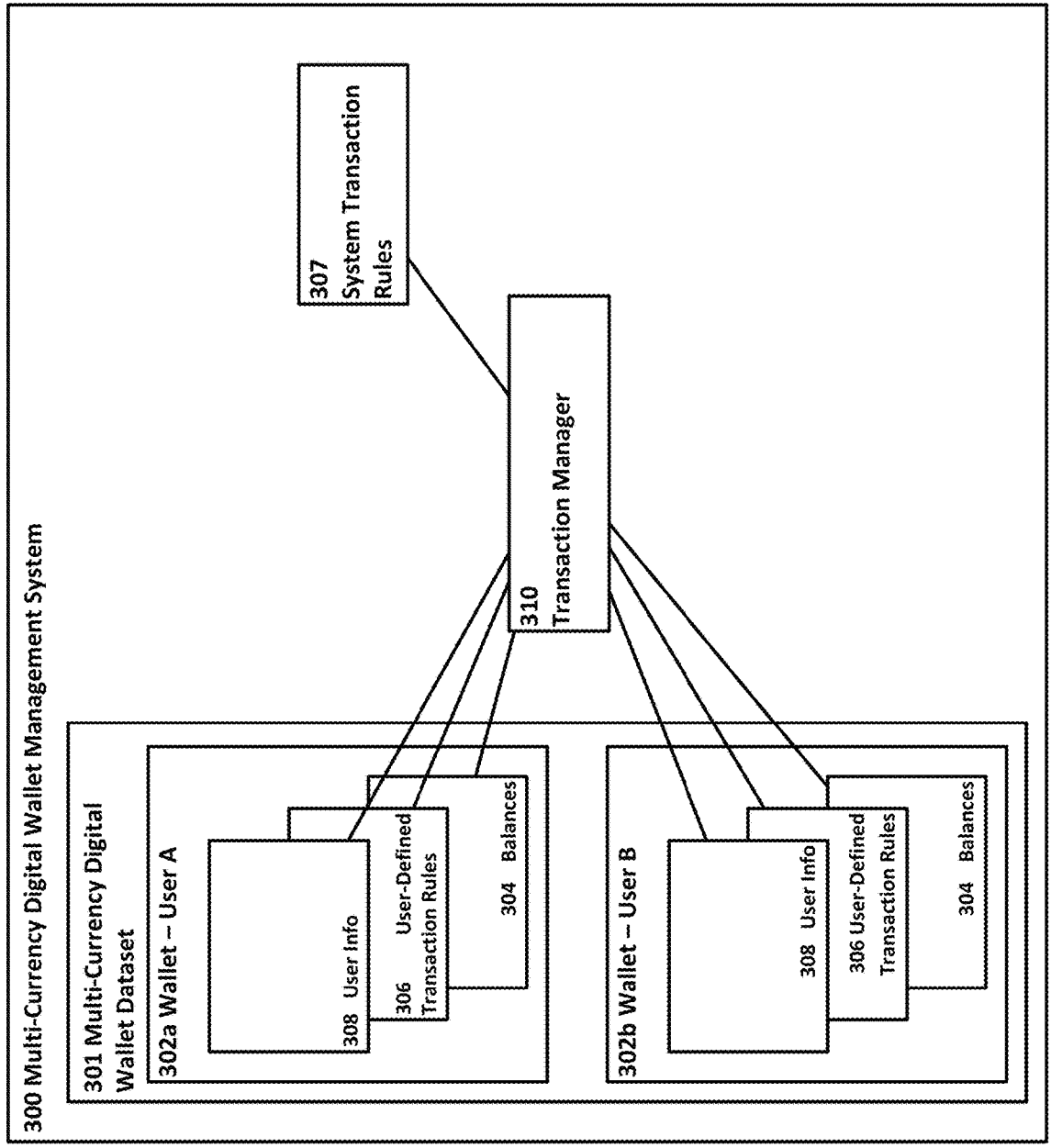
FIG. 3 depicts an example schematic of multi-currency digital wallet data structures.

FIG. 3 depicts an example schematic of multi-currency digital wallet data structures; U.S. patent application Ser.

No. 16/585,838, filed Sep. 27, 2019, previously incorporated herein by reference for all purposes, discloses examples of a digital wallet systems that may include similar data structures or benefit from such data structures. In FIG. 3, a multi-currency digital wallet management system 300 is shown. The multi-currency digital wallet management system 300 may include a number of servers, computers, network storage solutions, etc., that may collectively be configured to manage a number of different assets, including a multi-currency digital wallet dataset 301 that may include a plurality of multi-currency digital wallets 302, e.g., a multi-currency digital wallet 302a and a multi-currency digital wallet 302b. Each multi-currency digital wallet 302 may include various corresponding sub-datasets, e.g., user information dataset 308, user-defined transaction rules dataset 306, and a balances dataset 304. The user information dataset 308 may include, for example, the name, contact information, bank account information, password, biometric authentication information, etc. for the user associated with a particular multi-currency digital wallet 302. The user-defined transaction rule dataset 306 may similarly store information regarding user-defined transaction rules for the user associated with a corresponding multi-currency digital wallet 302. The balances dataset 304 may, as discussed below, store balance information for multiple different currencies that are managed by the corresponding multi-currency digital wallet.

The multi-currency digital wallet management system 300 may also include a transaction manager 310, which may be provided by one or more servers that execute one or more programs that are configured to communicate with whichever storage systems are storing and managing the various multi-currency digital wallet datasets 301 and to respond to and process transaction requests from, for example, applications executing on smartphones, e.g., multi-currency digital wallet interface applications that allow users of multi-currency digital wallets to exchange funds, request balance information, and engage in transactions with other devices, e.g., EGMs. The transaction manager 310 may also communicate with external data managers, such as banks, and initiate transactions with such external devices in order to transfer funds to or from a multi-currency digital wallet. In some implementations, the transaction manager may be configured to communicate with a separate digital wallet that is managed by an external data manager. In some such implementations, such an arrangement may take the place of direct communications with a bank or other financial institution. For example, digital wallets that conduct transactions with banks may, themselves, be required to comply with various banking regulations, e.g., anti-laundering regulations, reporting regulations, etc. Some multi-currency digital wallet systems, in order to avoid the complexity and overhead of compliance with such regulations, may not conduct transactions with banks directly but may instead conduct transactions with such "external" digital wallets. Thus, for example, if a player wished to add an amount of currency to an associated balance in a multi-currency digital wallet, the transaction manager may send a request for a monetary transfer of that amount of currency to an external wallet associated with the player. The external wallet, after validating the transaction, would then transfer that amount of currency to the multi-currency digital wallet (or to an account managed by the transaction manager); the external wallet, as part of engaging in this transaction, may, in some cases, initiate a corresponding transaction with a banking institution at which the player has an account and may similarly cause a similar amount of currency (potentially also including a transaction fee or surcharge) to be transferred to the external digital wallet. However, since the external digital wallet manages the interface to the banking institution, the multi-currency digital wallet can forego having to interface with the banking institution directly and avoid the need to comply with complex banking regulations. Similarly, if the player wished to transfer an amount of that currency from the multi-currency wallet to a bank account, for example, the transaction may involve a two-step process—a transaction implemented by the transaction manager that transfers that amount of currency from the multi-currency wallet to the external wallet; the user can then separately transfer that amount from the external wallet to their bank or, for example, debit from it to receive funds from an automatic teller machine. It will be understood that reference to transactions discussed herein between multi-currency digital wallets and banking institutions may, alternatively and as described above, also be implemented as transactions between multi-currency digital wallets and other digital wallets that are "external" to the multi-currency digital wallet system.

The transaction manager 310 may also interface with a system transaction rules dataset 307, which may store system transaction rule sets that may be applied to transactions for multi-currency digital wallets. As system transaction rules may frequently be applied to transactions for all, or at least large numbers of multi-currency digital wallets, such system transaction rules may often be stored in a separate dataset structure that is referenced with respect to transactions across a multitude of different multi-currency digital wallets 302. System transaction rules may also be stored in datasets that are associated with particular multi-currency digital wallets, e.g., if a manager establishes a system transaction rule that applies to a particular user of a multi-currency digital wallet, then such a rule may be stored, for example, in a dataset that is associated with that multi-currency digital wallet 302.

FIG. 4 depicts an example multi-currency digital wallet data structure, e.g., a database table, that shows a plurality of different currency balances associated with a particular multi-currency digital wallet for a particular player. Some of the fields depicted are provided for the benefit of the reader and may not actually be included in some actual implementations.

As can be seen in FIG. 4, there are a total of twenty different currency balances managed in this example multi-currency digital wallet; actual implementations may feature a lesser or greater number of such balances and/or currency types. For each currency balance, fields indicating an index number, currency icon or symbol, name, currency type, transaction rules or temporal adjustment rules, and actual currency balance are shown. As noted above, some implementations may use data structures that do not include all of the indicated fields, e.g., the currency symbol may not be stored for each multi-currency digital wallet record. It will be understood that the particular names assigned to some of the indicated currencies are not intended to be limiting, e.g., other equivalent or similar currencies may be given or known by other names.

It will also be understood that such information may be stored differently, e.g., distributed between multiple tables. For example, various transaction rules that may be applied to some or all of the indicated currency balances may be stored in a separate table, and one or more such transaction rules may be associated with (and applicable to) each currency balance.

The first three balances listed are each for a different direct hard currency, and reflect balances for US dollars, British pounds, and European euros. In this particular multi-currency digital wallet, the player who is associated therewith has $1238.23 in US dollars, but has zero British pounds or European euros. In this example, there is a transaction rule for the US dollar direct hard currency balance that causes 1% of any increases in that balance (regardless of origin) to be diverted to balance #19, which is the Karmabucks social responsibility currency balance; such a transaction rule may be implemented, for example, by a player who wishes to divert a portion of their winnings (or other contributions) to a charity. There are no transaction rules associated with the other two direct hard currency balances.

The next five currency balances shown are all indirect hard currencies, and include balances for promotional credits, marketing credits, "redeemables," and "BevBucks" and "GrubBucks." Promotional credits may, for example, be credits provided by the multi-currency digital wallet management system manager may provide to a player that may be usable by the player to place wagers but which may not be directly cashed out for direct hard currency (winnings from wagers placed with such promotional credits, however, may, in some implementations, be able to be cashed out for direct hard currency). Marketing dollars may be similar to promotional credits, but may also be able to be injected to trigger, for example, a group bonus or mystery award.

In this example, the promotional credit balance is associated with a transaction rule that causes the promotional credit balance to decrement by 20 units per week from the last visit of the player associated with the multi-currency digital wallet to one or more casinos designated by the multi-currency digital wallet management system manager. Thus, for example, if the player visits such a casino one or more times a week, the promotional credit balance would actually never be decremented according to this transaction rule.

The "redeemable" currency type, in this example, refers to indirect hard currencies that may not themselves be directly usable in place of direct hard currency but which may be redeemed to provide an amount of another type of indirect hard currency. For example, a player may be awarded with one or more of a variety of different virtual jewels, e.g., diamonds, emeralds, rubies, etc., that may each be able to be redeemed on an EGM to add an associated amount of promotional credits to that EGM's credit meter. In this example, the redeemable balance is actually a multi-dimensional array showing sub-balances for four different types of redeemables—types A/B/C/D; the player has two of redeemable type A, zero of redeemable type B, four of redeemable type C, and eight of redeemable type D. It will be understood that in an alternate implementation, each type of redeemable currency may be tracked by different, single-valued balance, as opposed to a multi-dimensional array balance.

It will be further appreciated that some transaction rules may be dynamically configurable to allow for exchange rates for certain currencies or the value of certain currencies to be dynamically adjusted. In particular, indirect currency types, e.g., redeemable currencies, marketing credits, promotional credits, etc., may have values that may vary based on associated transaction rules. For example, redeemable currencies may be subjected to a transaction rule that governs the redemption value of such currencies if redeemed for an in-game benefit. Such transaction rules may, for example, increase or decrease the in-game benefit received, e.g., the amount or efficacy of such in-game benefits may be increased by such a transaction rule during time periods, e.g., days or times of day, when there may be fewer players playing wagering games to encourage increased play of such wagering games (players are more likely to decide to play wagering games if the value of a redeemable currency that may be redeemable for an in-game benefit in such wagering games is increased). The redemption value of such redeemable currencies in such contexts may then be adjusted downward (or to a default level) by such a transaction rule when such encouragement is not needed due to the wagering games being used at a higher level of usage. Such transaction rules may be automated, e.g., based on various triggering conditions (such as total number of electronic gaming machines out of a population of electronic gaming machines being used by players) or may be manually established or modified, e.g., by a human operator. It will be appreciated that such transaction rules may be configured to be location- or electronic gaming machine-specific, e.g., different redemption values may be specified for a redeemable currency depending on the location where the redemption occurs or on which electronic gaming machine the redemption occurs. For example, in some instances, a transaction rule may be established that causes a redeemable currency to have an increased redemption value when redeemed on electronic gaming machines at a specific casino or in a specific area of a specific casino. In some other instances, a transaction rule may be established that causes a redeemable currency to have an increased redemption value when redeemed on particular types of electronic gaming machines at a particular casino or casinos under particular conditions, e.g., if a casino operator has invested in a several banks of new electronic gaming machines and wishes to encourage patrons to use these new machines, a transaction rule may be established to increase the redemption value of a redeemable currency on such electronic gaming machines at that casino as compared with a default or "face" value of such redeemable currency. Similar transaction rules may also be implemented for other currency types, e.g., promotional credits, marketing credits, and other types of indirect hard currency.

It will also be appreciated that a currency's exchange rate or value as defined by a relevant transaction rule may not be universally applicable, e.g., the transaction rule may establish a value or exchange rate for a given currency type that applies for exchanges of that currency type with another currency type, but the equivalent exchange rate may not apply to exchanges of that currency type with another, different currency type.

The BevBucks and GrubBucks currency balances are both examples of indirect hard currencies that can be used in place of direct hard currency, but only in certain establishments, e.g., BevBucks can only be used in certain bars or lounges (such as those controlled by the manager of the multi-currency digital wallet management system or that have an agreement with the multi-currency digital wallet management system manager to accept such BevBucks in place of direct hard currency). Similarly, GrubBucks can only be used in place of direct hard currency in certain restaurants, grocery stores, convenience stores, or snack stands (with similar constraints as with BevBucks).

The ninth currency balance shown in FIG. 4 is a soft currency called "social gaming points," which may be used in social gaming contexts, e.g., in mobile or online wagering game play. Such soft currency, as discussed earlier, may not be exchangeable for direct hard currency. Here, the player has 32,488 units of soft currency in the soft currency balance.

The tenth and eleventh currency balances shown are for non-national digital currency, e.g., Bitcoin and Ether.

The twelfth currency balance shown is a loyalty program currency, e.g., loyalty points. Such points may be accumulated in various ways, and a player's level or rank within a loyalty program may be determined based on their loyalty program currency balance. In this example, a transaction rule exists that causes an additional 100 units of loyalty program currency to be added to the loyalty program currency balance each day that the player associated with the multi-currency digital wallet visits one or more casinos designated by the multi-currency digital wallet management system manager.

The thirteenth through fifteenth currency balances are time-based currency balances, each reflecting an amount of time spent by the player associated with the multi-currency digital wallet playing different wagering games. The units of the time-based currency balances, in this example, are minutes, although other time units may be used instead, e.g., seconds, hours, or days; the units for different time-based currency balances may also differ from balance to balance, depending on what time-based unit is most relevant.

As can be seen, each of the time-based currency balances has an associated transaction rule that may cause such time-based currency balances to decay or potentially reset over time. For the time-based currency balance for Game A, for example, the amount in the balance may be reduced by 60 units per week; similarly, for the time-based currency balance for Game B, the amount in the balance may be reduced by 10 units per week. For the time-based currency balance for Game C, however, there is only an event-based transaction rule—if the player does not play Game C for more than a week (thus resulting in the time-based currency balance for Game C not being updated for more than a week), then the time-based currency balance for Game C may be reset to zero. Such decay or reset transaction rules may serve to encourage players to play such wagering games more often so as to either maximize their progress towards a particular time-played milestone or retain whatever time-based progress may be reflected in their multi-currency digital wallet time-based currency balance(s).

The next three balances listed are for game progression currencies for three different wagering games. Game progression may be reflected in a number of different ways; in this example, a player's game progression is a number that indicates to what level of the wagering game the player progressed. For example, if a wagering game included a "thermometer" graphic that rose in temperature each time the player achieved a particular result until a maximum temperature was reached (at which point, for example, the game might enter a special bonus mode), a numerical game progression currency may be used, with the value of the number indicating the temperature level indicated by the thermometer. Game progression currencies may also be provided in a variety of other ways, e.g., through a single or multi-dimensional array, textual information, binary codes, etc.

The penultimate balance shown in FIG. 4 is for "Karma-bucks," which is a form of social responsibility currency. In this example, the social responsibility currency balance is in US dollars and is subject to a transaction rule that causes the social responsibility currency balance to increment by 1 for every $100, 50£, or €100 spent at one or more designated casinos; this increment may be provided, for example, by transferring that amount of direct hard currency from another balance, e.g., in an account maintained by the multi-currency digital wallet management system manager or from an account operated by the party at which the funds are spent, to the social responsibility currency balance of the multi-currency digital wallet in question.

The last balance shown in FIG. 4 is for "Luck," which is, in this example, an informational currency that quantifies the luck of the player, e.g., a quantity that provides, for example, a measure of by how much the player may, on average, beat the odds (or not) on wagering games that the player plays. Such a value may, for example, be evaluated over the course of a defined time window, e.g., over the last three months, and may thus increase or decrease over time according to the player's wagering game performance. In this example, the player has a "luck" score of 12, which may indicate, for example, that the player achieved winnings on wagering games over the last three months that are, on average, 12% higher than would normally be expected.

It will be understood that multi-currency digital wallets may be implemented in a variety of different ways, but may generally include one or more datasets that store multi-currency digital wallet data, e.g., user information, balance information for each user for each of a variety of different currencies (as discussed above), and transaction rules. Such datasets may be stored in a variety of different ways, including, for example, on one or more secure servers that may be interacted with by a transaction manager, which may include one or more secure servers that are configured to receive transaction requests (or determine according to various transaction rules that a transaction is to be initiated), act on the transaction requests, modify balances in multi-currency digital wallets in the multi-currency digital wallet data set, provide information about potential transactions, and so forth. The transaction manager and the multi-currency digital wallet dataset manager may, in combination, be viewed as a multi-currency digital wallet management system. As with any financial transaction system, such a multi-currency digital wallet management system may feature various levels of encryption and authentication to ensure that the multi-currency digital wallet data is safeguarded and that only authorized individuals or entities are able to access the multi-currency digital wallet data and/or engage in transactions involving the multi-currency digital wallet data.

FIG. 3 depicts one example high-level system diagram for a multi-currency digital wallet management system. In FIG. 3, a multi-currency digital wallet management system 300 is shown; the multi-currency digital wallet management system 300 includes a multi-currency digital wallet data set 301, which includes, in this example, data for two multi-currency digital wallets 302—a multi-currency digital wallet 302a for User A, and a multi-currency digital wallet 302b for User B. In actual practice, the multi-currency digital wallet dataset 301 would include a much more extensive number of multi-currency digital wallets 302 for a correspondingly larger pool of users. As can be seen in FIG. 3, each multi-currency digital wallet 302 includes a corresponding dataset of currency balances 304 for each of the currency types that are managed with the corresponding multi-currency digital wallet 302, the dataset of currency balances 304 may, for example, be similar to the multi-currency digital wallet dataset shown in FIG. 4, although other ways of organizing such data may be used instead. In implementations of multi-currency digital wallet management systems that allow for user-defined transaction rules to be defined, the multi-currency digital wallet dataset 301 may also include a user-defined transaction rule dataset that may contain information that defines one or more user-defined transaction rules for one or more of the multi-currency digital wallets 302. Finally, each multi-currency digital wallet 302 may include a dataset of user information 308 that includes various pieces of information that describe parameters of characteristics associated with a user, e.g., username, actual name, address, password, banking information, etc. Multi-currency digital wallets 302 may also include additional information aside from the information discussed above; the above example is not intended to be exclusive or exhaustive.

The multi-currency digital wallet management system may also include a transaction manager 310 that may reference a dataset of system transaction rules 307, which may define one or more manager-established or controlled transaction rules. The transaction manager 310 may, for example, be configured to receive communications from various entities, e.g., vendors, users associated with multi-currency digital wallets, etc., that define one or more requests for a transaction involving a multi-currency digital wallet to be processed. The transaction manager may also initiate transactions on its own, e.g., responsive to various transaction rules, or in response to other communications that are not explicit requests for a transaction to be performed, e.g., the transaction manager may receive a communication indicating that a particular user has engaged in activity that satisfies the requirements of one or more transaction rules and thereby causes the transaction manager to implement one or more transactions.

Figure 5:
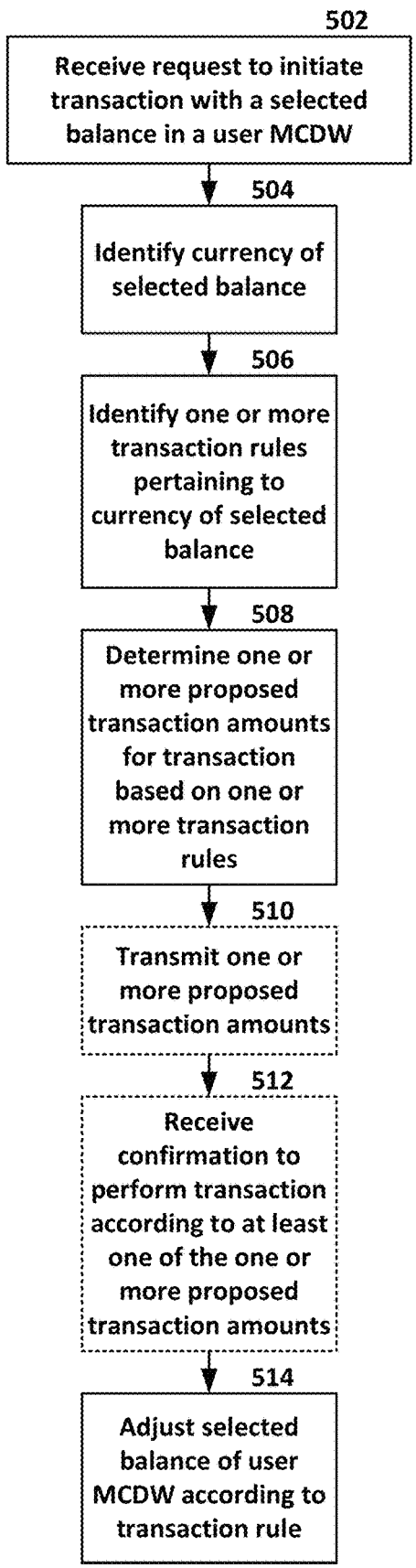
FIG. 5 depicts an example high-level flow diagram for the operation of a transaction manager for multi-currency digital wallets.

A high-level example of general operation of an example transaction manager is illustrated in FIG. 5. In FIG. 5, the transaction manager may receive a request to initiate a transaction using a selected balance in a multi-currency digital wallet (MCDW) in block 502. Such a request may, for example, be received from a user associated with the MCDW (for example, if the user is using an MCDW management app on a smartphone and has requested to perform a transaction, such as exchanging one currency for another, using one or more balances in their MCDW) or from a vendor or other entity that wishes to engage in a transaction with the user associated with the MCDW.

In block 504, the transaction manager may identify the currency of the selected balance; if the transaction potentially involves one or more other types of currency, the transaction manager may also identify those other types of currency. In block 506, the transaction manager may identify one or more transaction rules that pertain to the currency of the selected balance (and also potentially to the other currencies identified in block 504, e.g., transaction rules governing an exchange rate from the currency of the selected balance to one or more other currencies).

In block 508, one or more proposed transaction amounts may be determined for the requested transaction, each proposed transaction amount determined according to one or more relevant transaction rules. For example, if a transaction request is a request by a user to exchange a particular currency for any other eligible currency, the transaction manager may determined proposed transaction amounts for each such eligible currency. Similarly, if a transaction request is a request by a user to exchange a particular currency for a single other type of currency, or to use an amount of that currency for a transaction with a vendor or EGM, the determined proposed transaction amount may be calculated only for that single other type of currency or in whatever currency is specified by the vendor or EGM.

In block 510, the one or more proposed transaction amounts may be transmitted by the transaction manager to another entity, e.g., to a smartphone app associated with the user, to a vendor, etc., In block 512, the transaction manager may receive a confirmation message indicating that one or more of the proposed transaction amounts is accepted by the user of the MCDW and, in block 514, the transaction manager may cause the selected balance of the user's MCDW to be adjusted based on the transaction rules that determined the accepted transaction amount. It will be understood that this is but one high-level example of how a transaction manager for an MCDW may function; there may be a wide variety of ways that such functionality may be provided, and this disclosure is not intended to be limited to any particular implementation of an MCDW management system/transaction manager. For example, in one variant of the above, blocks 510 and 512 may be optionally performed, e.g., there may be cases where the proposed transaction amount is simply determined according to the relevant transaction rule(s) and the transaction then executed without transmission of the proposed amount to the user, or confirmation by the user, beforehand.

While transaction requests may be processed by a transaction manager in a generally on-demand manner responsive to receipt of transaction requests initiated by MCDW users, vendors, etc., the transaction manager's handling of transactions involving temporal adjustment rules may be performed in a more on-going and generally continuous manner.

Figure 6:
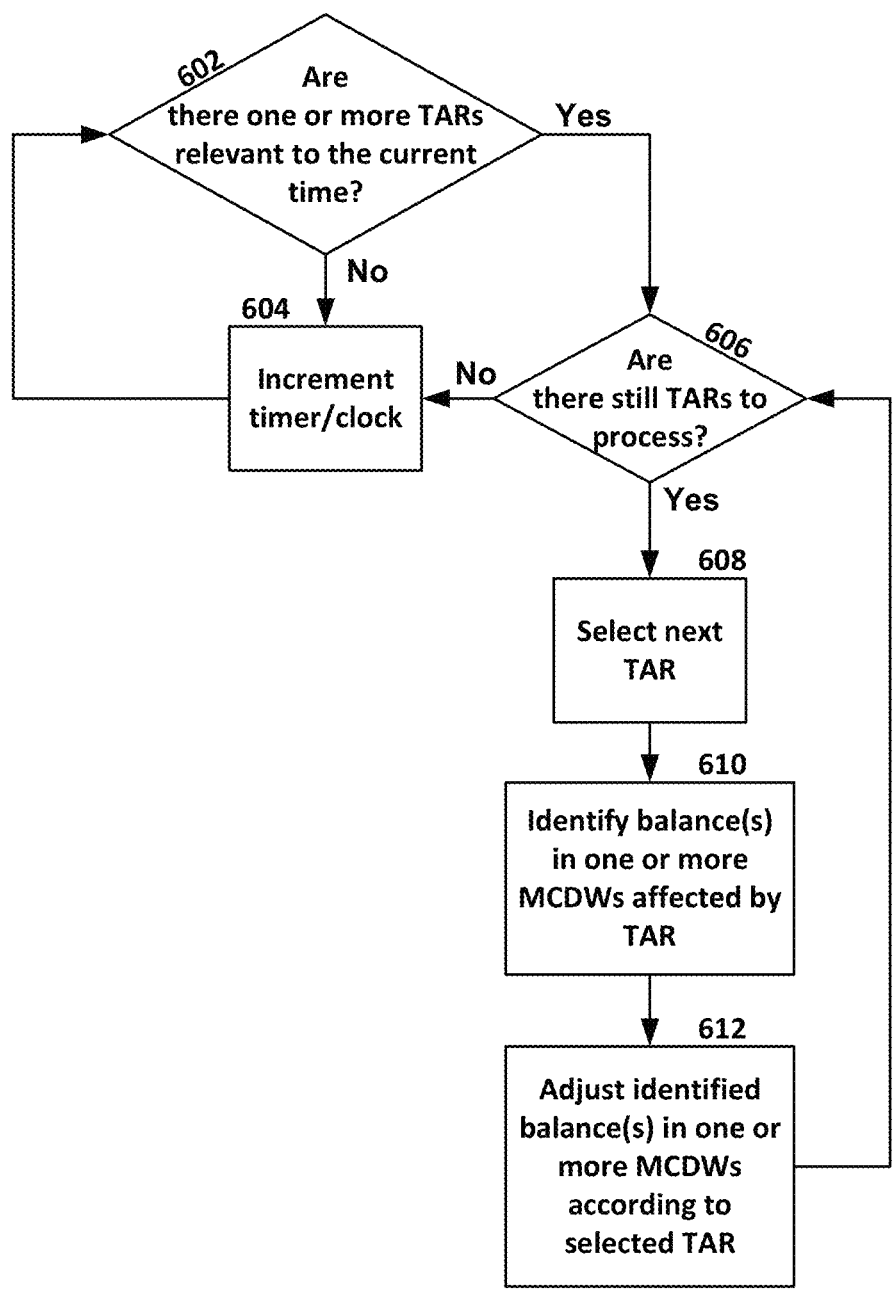
FIG. 6 depicts an example high-level flow diagram for the handling of temporal adjustment rules by a transaction manager for multi-currency digital wallets.

FIG. 6 depicts a high-level flow diagram of an example technique that may be implemented by a transaction manager for handling of temporal adjustment rules (TARS). In block 602, the transaction manager may check to see if there are any temporal adjustment rules that are relevant to the current time. This may involve checking to see if there are any temporal adjustment rules that are configured to execute at that particular date and time or if there are any MCDWs that satisfy the conditions of a temporal adjustment rule at that particular date and time. For example, some temporal adjustment rules may have "static" temporal conditions, e.g., "at midnight EST of each day, adjust a particular balance or balances downward by 1%," whereas other temporal adjustment rules may have "dynamic" temporal conditions, e.g., "10 days after a user last places a wager on an electronic gaming machine at a designated casino, adjust a particular balance or balances downward by 1%." The transaction manager may thus, at any given time, identify temporal adjustment rules that are relevant to the current time based on both static and dynamic temporal conditions.

If it is determined in block 602 that there are not TARs applicable to the current time, the technique may proceed to block 604, in which a timer or clock may be incremented to a later time. The technique may then return to block 602 to check if there are any applicable TARs for the new current time. It will be understood that while the various blocks shown in FIG. 6 may suggest, for example, that the increment timer/clock step is performed only after a determination is made as to whether there are any TARs relevant to the current time, the various steps in the technique of FIG. 6 may be performed asynchronously, e.g., the timer/clock of block 604 may be advanced at regular intervals, and there may be multiple instances of step 602 being performed in parallel, each for a different relevant time.

If it is determined in block 602 that there are one or more relevant temporal adjustment rules for the time of interest in block 602, the technique may proceed to block 606, in which a determination may be made as to whether there are still temporal adjustment rules for that time of interest that need to be processed. If not, the technique may return to block 604. If so, the technique may proceed to block 608, in which the next temporal adjustment rule that is relevant to the current time may be selected. In block 610, any balances in one or more MCDWs that may be affected by the selected temporal adjustment rule may be identified and then, in block 612, adjusted according to the requirements of the selected temporal adjustment rule. The technique may then return to block 606 to see if further temporal adjustment rules remain to be applied. As with the technique of FIG. 5, it will be understood that there may be many different ways of implementing a transaction manager so that it is able to handle temporal adjustment rules, and the depicted example is not intended to be limiting.

Multi-currency digital wallets according to the present disclosure may be made accessible to users through a variety of different user interfaces, including user interfaces on web pages, mobile device applications (or "apps"), plugins operating on EGMs, applications operating on free-standing kiosks in a venue, etc. Various features of multi-currency digital wallets according to the present disclosure are discussed below with respect to various graphical user interfaces for mobile devices, although similar interfaces, it will be understood, may be offered in other contexts as well, e.g., desktop computing devices, web pages, etc.

One key feature provided by some multi-currency digital wallets according to the present disclosure is the ability thereof to provide the user associated with a multi-currency digital wallet with a high-level overview of all of the various balances tracked by the multi-currency digital wallet. FIG. 7 depicts an example GUI for a multi-currency digital wallet that provides a snapshot of the currency balances tracked by the multi-currency digital wallet; the GUI of FIG. 7 is sized for presentation on smartphones or other mobile devices, but GUIs providing similar contents in other formats may be used as well.

The GUI of FIG. 7 features user information 712 identifying the person associated with a multi-currency digital wallet. A plurality of records is shown in a scrollable list, e.g., scrollable using scroll handle 730, positioned below the user information 712. Each record represents a different currency balance, and includes a currency indicator 720, a corresponding balance indicator 718, and, optionally, one or more icons for initiating various transactions using the relevant currency balance. In this example, seven records are visible, although additional such records may be included off-screen and reached by scrolling through the list of records. The various currency indicators shown in include currency indicator 720a, which is for US dollars and has an associated balance indicator 718a of 1238.23 units; a currency indicator 720b, which is for promotional credits and has an associated balance indicator 718b of 50 units; a currency indicator 720c, which is for marketing credits and has an associated balance indicator 718c of 20 units; a currency indicator 720d, which is for redeemables and has an associated balance indicator 718d that shows balances for multiple different types of redeemables; a currency indicator 720e, which is for social gaming points and has an associated balance indicator 718e of 32,488 units; a currency indicator 720f, which is for loyalty points and has an associated balance indicator 718f of 120,020 units; and a currency indicator 720g, which is for Karmabucks and has an associated balance indicator 718g of 145 units.

As can be seen, the balance indicators used may be in the form of a single number, or a set of numbers, e.g., as is indicated for the redeemables currency indicator 720d. For the redeemables currency indicator 720d, there are balance indicators 718d for five different types of redeemables shown; an ellipsis indicates that additional such balance indicators exist for other types of redeemables that are not shown but can be accessed or viewed, for example, by selecting an additional control, such as drop-down arrow 728, which may cause a more detailed listing of redeemable balance indicators 720d to be shown.

As mentioned above, in addition to the currency indicators 718 and the balance indicators 720, the records shown may also, in some implementations, include one or more icons, in some cases, that allow the user of the multi-currency digital wallet to engage in various types of transactions with the multi-currency digital wallet.

For example, one or more of an "add currency" icon 722, a "withdraw currency" icon 724, and an "exchange currency" icon 726 may be included for each currency type (there may also be some currencies, e.g., informational currencies, that do not have any of these icons provided). For the purposes of this discussion, the greyed-out icons 722, 724, and 726 in FIG. 7 are disabled with respect to the currency balances that they are associated with; the enablement or disablement of such controls or icons may be governed, for example, by one or more transaction rules. It will also be understood that such controls may be completely hidden from view or not displayed at all to prevent their potential selection by a user. The enablement or disablement of such controls on a per-currency basis may reflect the types of transactions that may be engaged with by a user with regard to such currencies.

The add currency icon 722 for a particular currency may, when enabled and selected by a user, allow the user to "add" an amount of that currency to the multi-currency digital wallet from outside sources at any time, e.g., using a credit card or by entering bank information. The withdraw currency icon 724 for a particular currency, when enabled and selected by a user, may be similarly used to withdraw an amount of that currency from the multi-currency digital wallet and transfer it to sources outside of the multi-currency digital wallet, e.g., to a user's bank account. The exchange currency icon 726 for a particular currency may, when enabled and selected by a user, allow the user to use the transaction manager to exchange an amount of that currency for an amount of another currency managed within the multi-currency digital wallet.

The GUI of FIG. 7 may also include various other controls, e.g., a configuration button 716, which may be used, for example, to access and/or change various multi-currency digital wallet parameters, e.g., password, email address, etc., and a search button 714, which may be used to access a search GUI discussed later.

FIG. 8 depicts a GUI that allows a user to engage in a currency exchange transaction within a multi-currency digital wallet. Such an interface may be presented, for example, in response to a user pressing the exchange currency icon 726 for a currency type—in this example, the GUI that is shown is an example of a GUI that may be presented a user presses the exchange currency icon for the US dollars balance indicator 718a in FIG. 7.

In the GUI of FIG. 8, a currency indicator 720a is shown in the top part of the GUI for the currency type to be exchanged; a balance indicator 718a is shown for that currency type, as well as a proffer amount 732 and increment/decrement buttons 734. The proffer amount 732 is the amount or portion of the balance indicator 718a that is to be exchanged; in this example, the balance indicator 718a has been adjusted (decremented) to reflect what the balance for the currency indicator 720a will be if the proffer amount 732 is actually exchanged for another currency. In other implementations, the balance indicator 718a may be left unchanged until after the exchange has actually occurred. The increment/decrement buttons 734 may be used to increase or decrease the proffer amount 732; in some implementations, the proffer amount 732 may be a directly editable field, e.g., the user may tap on the proffer amount 732 and type a new proffer amount 732 (or edit the existing one) using an on-screen keyboard that is shown for the purposes of such edits.

The GUI of FIG. 8 also shows the various currency types that the currency for balance indicator 720a can be exchanged into in list form in the lower portion of the GUI—this list may be filtered to only display entries for currency types for which a valid exchange may be made. Thus, for example, the promotional credit and marketing credit currency types shown in FIG. 7 are not listed, as such currency types, in this example, are not exchangeable for US dollars.

Each list entry in the GUI of FIG. 8 may include a corresponding currency indicator 720, balance indicator 718, offered exchange value 738, and confirmation button 736. The balance indicators 718 for the list entries may indicate the current balances of each listed currency type, and the offered exchange values 738 may indicate the amount of that currency type that is offered in exchange for the indicated proffer amount 732. The GUI may be controlled to show entries for currency types not currently in the user's multi-currency digital wallet, e.g., the multi-currency digital wallet in this example does not have any Ether currency, but the user may still exchange the proffer amount 732 into the indicated amount of Ether within the multi-currency digital wallet. If the user wishes to engage in an exchange transaction for one of the listed currency types, they may select the corresponding confirmation button 736 to initiate or complete such a transaction.

In the depicted GUI, the proffer amount is negative, resulting in a decrease in the balance indicator 718a of the relevant currency type. In some implementations, however, the exchange interface may be configured to also allow for the proffer amount to be positive, which would result in the balance indicator for the associated currency type increasing if the exchange transaction were to be completed. In such instances, the offered exchange values 738 shown may instead be amounts by which each currency balance associated therewith may be reduced if the exchange transaction is pursued.

The various exchange, add, or withdraw transactions that may be engaged in via the GUIs of FIGS. 7 and 8 may be managed through the transaction manager, which may generate, for example, determine which currency types may be eligible for exchange and the offered exchange value 738 for each currency type for a given proffer amount 732. If a transaction is confirmed by the user, then the transaction manager may cause the transaction to be completed by adjusting the balance for the proffer amount by the proffer amount and adjusting the balance for the currency of the accepted offered exchange value 738 by that offered exchange value 738 in the opposite direction.

Such GUIs allow the user of the multi-currency digital wallet to easily transfer assets between one currency type and another, all from within a streamlined and centralized interface. It will, however, be understood that other GUIs may be used to achieve similar functionality, and the scope of the present disclosure is not to be limited to only the embodiments discussed herein, particularly with respect to the GUIs shown—there may be many other GUIs that may be used to provide similar functionality that would fall within the scope of this disclosure.

Figure 9:
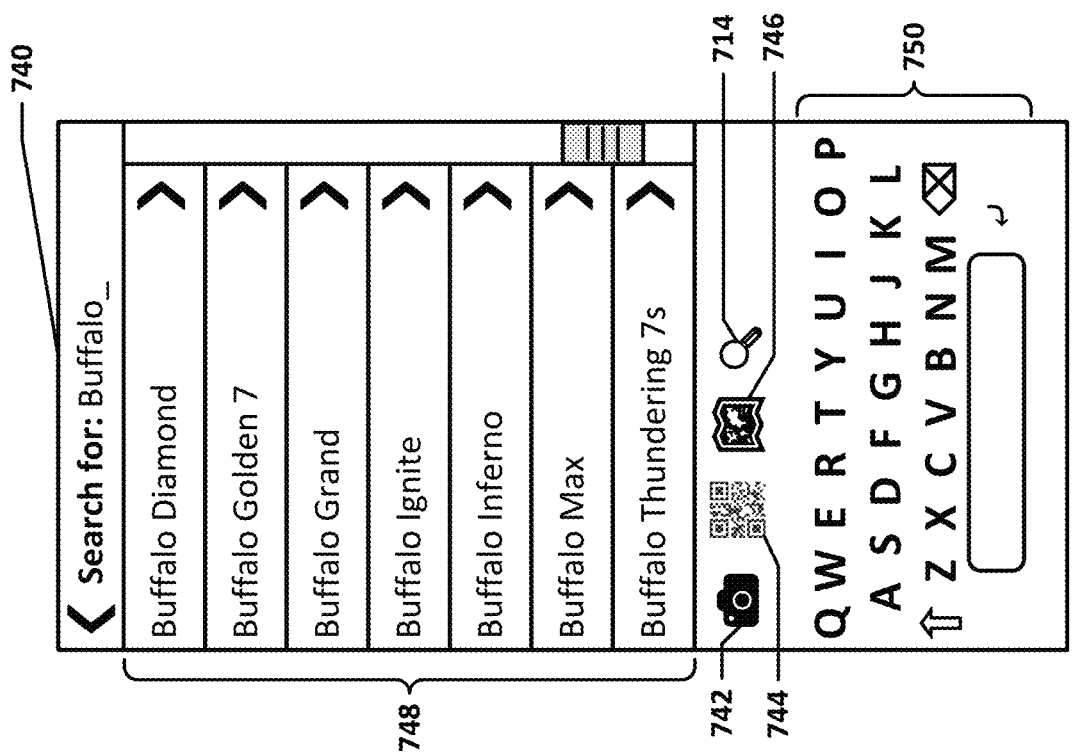
FIG. 9 depicts a search GUI that may be provided by a multi-currency digital wallet system in response to a user selecting a search function.

Multi-currency digital wallets of the present disclosure may also provide users with a centralized and streamlined mechanism for reviewing the currency types that particular vendors, EGMs, or other entities may accept in transactions. FIG. 9, for example, depicts a search GUI that may be provided by a multi-currency digital wallet system in response to a user selecting, for example, the search icon 714. The GUI of FIG. 9, for example, may have a search field 740, in which a user may type search terms using a keyboard 750; search results 748 may then be provided that match the entered search terms; the user may then select one of the search results 748 to launch a further GUI, such as the GUI of FIG. 10, that provides further information about the selected search result 748. The search GUI may also offer other mechanisms that allow a player to identify a particular vendor or entity for which further information regarding acceptable currency types for transactions therewith is desired. For example, a camera icon 742 may be provided to allow the user to use a camera of the device on which the GUI is presented to take a picture of a product or venue; machine vision algorithms may then be used to extract information that identifies one or more vendors or entities or devices associated with the imaged content; these entities or devices may then be listed so that the user may select one. In another example, quick-recognition (QR) code icon 744 may be provided to allow a user to use the camera of the device to take an image of a QR code or other machine-recognizable code that may identify a particular entity or device, e.g., EGM, that is enrolled in the multi-currency digital wallet management system; the identified entity or device may then be shown in the GUI of FIG. 10, for example. In yet another example, the map icon 746 may be provided to allow the user to see a list of entities or devices that are in geographic proximity to the device on which the GUI is displayed, e.g., based on geolocation data for the device and geographic coordinates associated with the various entities or devices that may be tracked by the multi-currency digital wallet management system.

Figure 10:
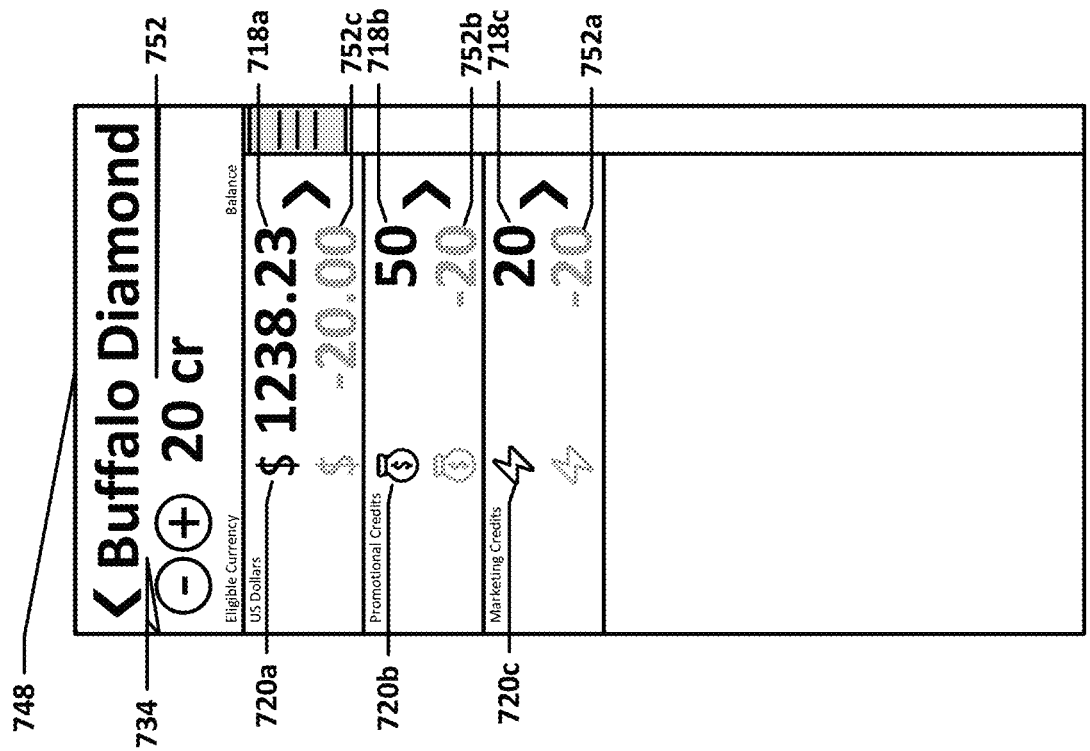
FIG. 10 depicts a GUI that shows one or more potential transactions that may be engaged in with a particular entity or device for a particular service, product, or experience.

Once a particular entity or device, e.g., EGM, is selected, e.g., via a GUI such as the one shown in FIG. 9, a GUI such as that shown in FIG. 10 may be provided. FIG. 10 depicts a GUI that shows one or more potential transactions that may be engaged in with a particular entity or device for a particular service, product, or experience.

In the GUI of FIG. 10, information identifying a selected search result 748 may be provided in the top portion of the GUI, along with, for example, information 751 identifying a particular product, service, or experience associated with that selected search result 748. In this example, the search result is a particular type of wagering game, and the information 751 identifying a particular product shows a quantity of credits that may be used to play such a wagering game. Increment/decrement buttons 734 may be provided, as in various other interfaces, to allow the user increase or decrease the quantity of credits. Other types of products may be shown instead of EGM credits, e.g., tickets to a particular show, rooms in a hotel, etc. Listed below the information 751 identifying a particular product, service, or experience are list entries showing the various currencies that are available in the user's multi-currency digital wallet and that may be used to purchase the indicated product, service, or experience. For example, in this particular instance, the user has three currencies in their multi-currency digital wallet that may be used to purchase 20 credits for use with the Buffalo Diamond wagering game. For each such currency type, the GUI may show, for example, the relevant currency indicator 720 and balance indicator 718, as well as a corresponding purchase amount 752 in that respective currency for the indicated product, service, or experience. This may allow a user to easily see what various products, services, or experiences might cost in the various currencies that their multi-currency digital wallet contains.

It will be understood that the GUI shown in FIG. 10, or a similar GUI, may be used in contexts other than with a search result. For example, the GUI of FIG. 10 may be presented when the user of a multi-currency digital wallet is engaging in a purchase or other transaction; in such implementations, the various list entries may further include a confirmation button, e.g., similar to the confirmation buttons 736 shown in the exchange GUI of FIG. 8, that allows the player to select a particular currency balance to use for payment of the indicated purchase.

Figure 11:
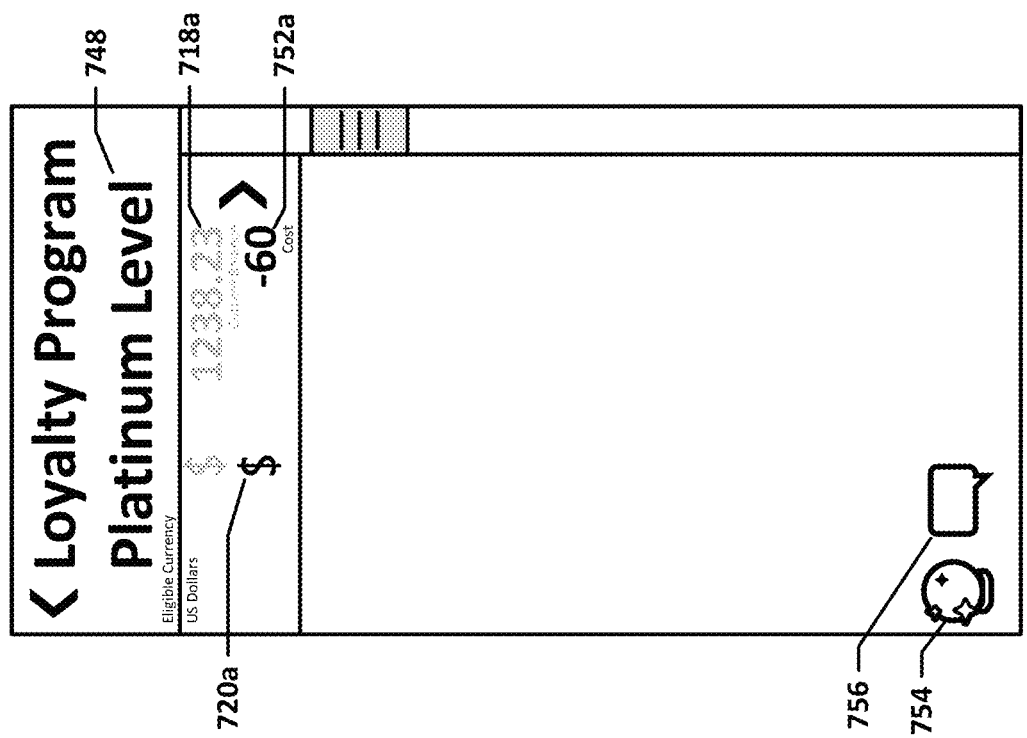
FIG. 11 depicts another GUI that is similar to that of FIG. 10.

FIG. 11 depicts another GUI that is similar to that of FIG. 10. FIG. 10 depicts a GUI in which search result 748 for a desired product, service, or experience is shown. In this example, the product in question is elevation of the user to a particular level of a loyalty program. Loyalty programs may offer users varying degrees of benefits depending, for example, on the level of the user within the program. Such levels may, for example, correspond to different point values of loyalty points accrued by a user. In this example, the user wishes to advance to the next level of their loyalty program, which is platinum level, without having to spend time earning the points to do so.

The transaction manager, which has received a request from the mobile device on which the GUI is being presented to provide such information, has determined that the player may be elevated to the next level of the loyalty program in exchange for $60 in direct hard currency; in this example, the user's multi-currency digital wallet does not have any other balances in any other currencies accepted by the loyalty program that have sufficient funds to purchase the indicated loyalty program level enhancement, so only the single possible transaction is listed—the user may, if desired, select the right-facing chevron indicator to initiate the desired transaction, in this case. However, the GUI of FIG. 11 also includes additional icons in the lower left—a "crystal ball" icon 754 and a "suggestion" icon 756.

Figure 12:
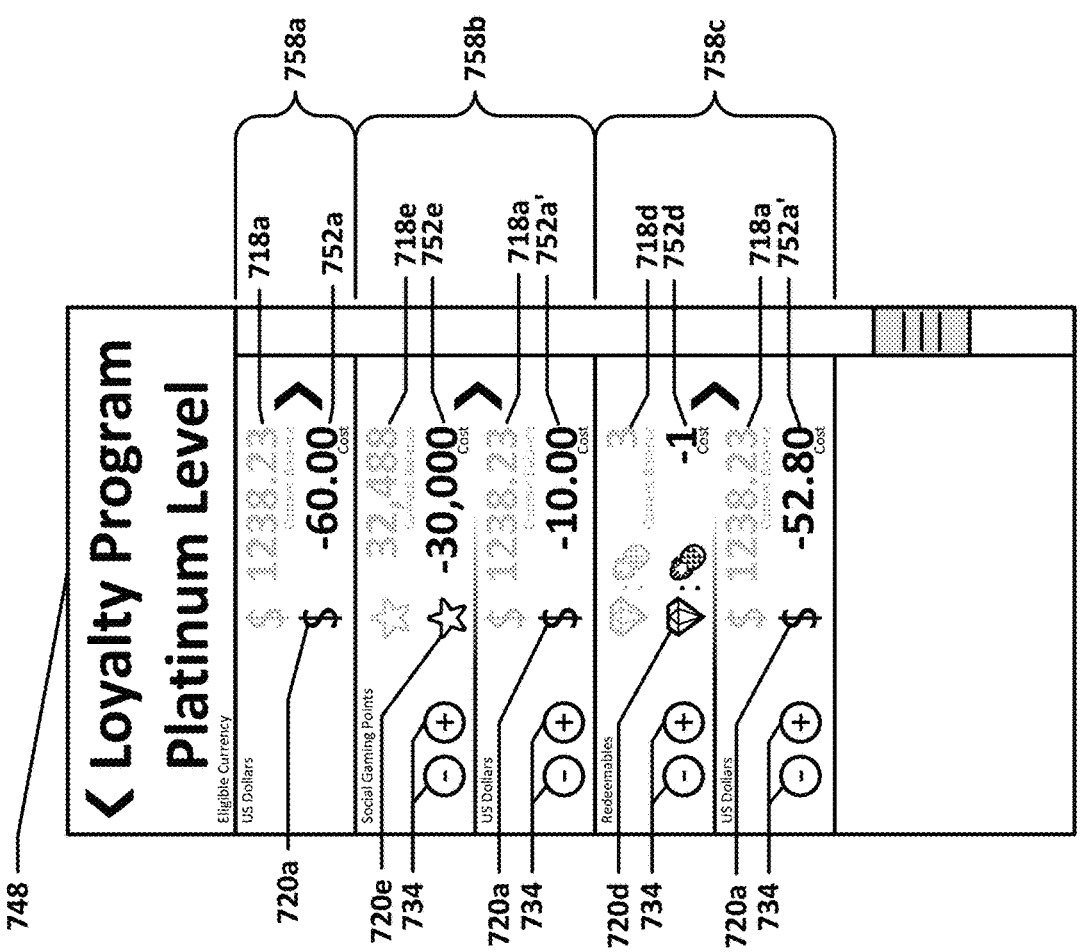
FIG. 12 shows a GUI that allows for purchases to be made using a combination of different currencies.

Such icons may be selected by the user to cause the GUI of FIG. 11 to be modified in various ways; it will be understood that, of course, other icons may be used instead, if desired. For example, selection of the crystal ball icon 754 may cause the transaction manager to provide additional options for making the indicated purchase, e.g., such as may be made by combining amounts of different currencies. FIG. 12 shows a GUI that allows for purchases to be made using a combination of different currencies.

In FIG. 12, the GUI that is shown is similar to that of FIG. 11, except that the list of entries 758 of possible currencies that may be used to make the indicated purchase has been expanded to include two additional entries. List entry 758a corresponds to the single option shown in the GUI of FIG. 11, whereas list entries 758b and 758c are new entries that are composite entries that each include amounts of two different currencies. In this case, the list entries 758b and 758c each include currency indicators 720 and corresponding balance indicators 718 for two or more currency types, as well as a corresponding purchase amount 752 in each currency type. Increment/decrement buttons 734 may also be provided to allow the corresponding purchase amounts to be easily increased or decreased should the user wish to adjust the portion of the purchase price that is allocated to each currency. For example, the list entry 758b indicates that the user may purchase the loyalty program platinum level for a combination of $10 in US dollars and 30,000 social gaming points. If desired, the user could press the increment button of the increment/decrement buttons 734 for the US dollars currency indicator 720a to increase the portion of the purchase price that will be in US dollars to be $20; the transaction manager (or other computing system, e.g., the mobile device processor), may then determine that the portion of the purchase price for list entry 758b that will be in social gaming points should, responsive to such an increase, be decreased to 24,000 units.

In the example of FIG. 12, one of the possible purchase options involves a split purchase between US dollars and a quantity of a particular type of redeemable (a pineapple redeemable, in this example), of which the user has three.

In some cases, multiple purchase amounts 752 may be shown for the same currency on the GUI—for example, the US dollars purchase amount 752a is shown in each of the list entries 758, but with differing values, e.g., 752a, 752a', and 752a"; this reflects the different quantities of such currency that may be used in combination transactions in which the currency is combined with another currency to make a transaction.

The GUI of FIG. 12 allows the user to explore various "what-if" scenarios of different currency combinations that may be made to make a particular purchase or engage in a particular transaction. In effect, such an interface serves as a combination of the exchange GUI that was discussed with respect to FIG. 8 and the search result GUI of FIG. 11.

In this particular case, since the particular transaction in question is a virtual transaction, e.g., can be completed without any physical exchange of goods or ties to a particular physical location, the GUI of FIG. 12 allows for the user to actually proceed with one of the indicated transactions, e.g., by selecting the rightwards-pointing chevron associated with any of the particular list entries 758.

Figure 13:
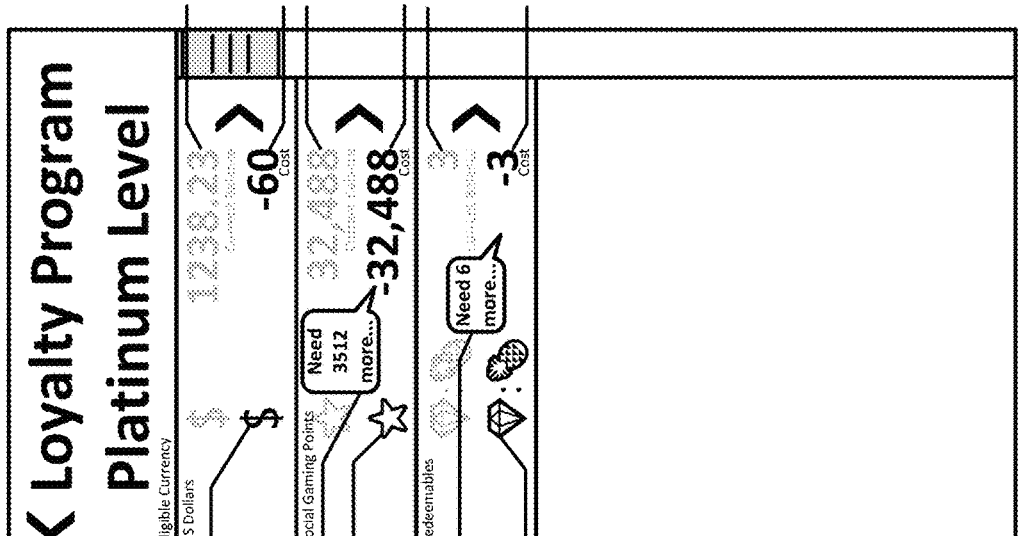
FIG. 13 depicts a GUI that not only shows potential options for purchasing a particular product, but also other potential currencies that may be in a player's multi-currency digital wallet but not in quantities sufficient to make the desired purchase.

Selection of the suggestion icon 756 may, for example, cause a GUI such as that shown in FIG. 13 to be depicted. FIG. 13 depicts a GUI that not only shows potential options for purchasing a particular product, but also other potential currencies that may be in a player's multi-currency digital wallet but not in quantities sufficient to make the desired purchase. Such a GUI may provide information to the user regarding suggestions of how much more of each such currency the player would need in order to make the desired purchase.

In FIG. 13, additional list entries for currency types that may be used to make the indicated purchase are shown, but the entries for currency indicators 720e and 720d have notifications 760e and 760d that indicate that additional units of the corresponding currency are required in order to complete the indicated transaction.

Multi-currency digital wallets provide a centralized, easy-to-use system for allowing players or users thereof to manage a large number of different balances in a variety of different types of currency. In many implementations, multi-currency digital wallets are typically associated with single individuals, i.e., each instance of a multi-currency digital wallet is associated with a particular individual. Access to any individual multi-currency digital wallet may be restricted so as to only allow the individual that is associated therewith to be able to view balances therein and/or engage in transactions with entities using portions of the balances tracked by the individual's multi-currency digital wallet. For example, multi-currency digital wallets may be protected using passwords, biometric (fingerprint, iris, facial and/or voice recognition) authentication, two-factor authentication, and/or any other appropriate security measures. For example, a user may be allowed to access their multi-currency digital wallet using an application ("app") that they have downloaded to a smartphone that they own. The user may then, for example, be provided with various GUIs that allow the user to either create a new multi-currency digital wallet and associate it with themselves or provide credentials that allow the app to request data for a preexisting multi-currency digital wallet from the multi-currency digital wallet management system. Once the app has been associated with a particular multi-currency digital wallet, the app may, in some instances, be configured to allow a user of the smartphone to access, e.g., view balances and/or engage in transactions with, the multi-currency digital wallet without needing further authentication (for example, if the smartphone has security features, such as a lockscreen requiring a valid passcode and/or fingerprint to be provided in order to unlock, enabled that limit access to the smartphone's applications and data to the owner of the smartphone). In other implementations, the app may require that the user authenticate themselves every time the app is used to further protect the user's multi-currency digital wallet from unauthorized access.

In some implementations, two different types of multi-currency digital wallet may be managed by a multi-currency digital wallet management system: user multi-currency digital wallets and group multi-currency digital wallets. The concepts relating to user multi-currency digital wallets and group multi-currency digital wallets may, in many respects, also be implemented in single-currency digital wallets as well (in which case they may be managed by a single-currency digital wallet management system which may provide similar functionality to a multi-currency digital wallet, except without multi-currency functionality). For ease of the following discussion, reference will simply be made herein to "user digital wallets" and "group digital wallets"; such references should generally be understood to potentially refer to either single-currency or multi-currency versions thereof unless otherwise inconsistent with a particular feature or implementation being described. A user digital wallet is a digital wallet that is typically associated with a single individual that generally has the ability to engage in transactions with that digital wallet, e.g., access currency balances for the user digital wallet, transfer funds to or from balances of the user digital wallet, etc. The user associated with a user digital wallet may often have unfettered access to the funds in at least one balance associated therewith, e.g., a direct hard currency balance, allowing them to transfer funds from that balance to, for example, their bank account.

A group digital wallet, by contrast, is a digital wallet that is associated with multiple individuals, each having their own respective user digital wallets. Thus, each group digital wallet may be implicitly or explicitly associated with the plurality of user digital wallets associated with the users associated with that group digital wallet. Group digital wallets may be used, for example, by players who wish to pool assets for use in particular circumstances. For example, individuals may participate in "team" events in which multiple individuals band together to form a team for the purposes of playing wagering games—in such examples, the players may all agree to pool resources and to certain rules governing how such pooled resources are to be used, as well as to how to distribute the remaining pool resources at the conclusion of the team event (or, in some instances, when a particular user wishes to cash out and stop participating). Another scenario in which group digital wallets may be useful, for example, is to allow a group of users to pool resources for a variety of potential purposes, e.g., individuals in a bachelor or bachelorette party may establish a group digital wallet that each individual may contribute resources to and which may be used by any of the bachelor or bachelorette party members to engage in various transactions, e.g., paying for food or drinks at certain eating or drinking establishments, purchasing tickets to a show, and/or engaging in wagering game play. Yet another scenario in which a group digital wallet may be useful is in fundraising or charity events in which some or all of the balance(s) of the group digital wallet may be donated to a charitable cause or non-profit corporation. In such an implementation, users associated with the group digital wallet may, for example, engage in wagering game play using resources of the group digital wallet, but portions of transactions that result in an increase in the balance or balances thereof, e.g., winning an award in the wagering game or cashing out of a wagering game with more credits than were provided by a player for play on that wagering game, may cause a portion of the increase to be diverted to, for example, a social responsibility balance managed by the group digital wallet. Group digital wallet management systems may generally be configured such that amounts of currency that are received by a player based on a transfer of funds from a group digital wallet are ultimately transferred back to that same group digital wallet. For example, if a player transfers funds from a group digital wallet to an EGM for wagering game play and then ends up winning a large jackpot award, the player will generally not be allowed to transfer the credits (and jackpot award) that have accumulated on the EGM to, for example, the player's user digital wallet (at least, not without first transferring those credits to the group digital wallet first—if the group digital wallet is configured to then allow the player to transfer such a winning to their individual user digital wallet, then the player may be able to do so from the group digital wallet).

A group digital wallet may be structured in a similar manner to a user digital wallet and may include information defining one or more balances for a currency or multiple currencies associated with the group digital wallet. In contrast to a user digital wallet, which may also be associated with information identifying a particular individual, a group digital wallet may be associated with information that identifies multiple individuals. Such information, in some implementations, may simply identify one or more particular user digital wallets, and the digital wallet management system that manages the group and user digital wallets may be configured to reference user data associated with the user digital wallets of the users associated with the group digital wallet when such data is needed. For example, if a user associated with a group digital wallet attempts to access that group digital wallet via an app, the app may request that the user provide, for example, information that identifies the user or the user's user digital wallet (a name, user account number, etc.) and some form of authentication associated with the user's digital wallet, e.g., a password, biometric information, etc. The app may then request that the digital wallet management session a) confirm that the identified individual (or their user digital wallet) is currently associated with that group digital wallet and b) that the authentication provided by the user establishes that the user is authorized to access the identified user digital wallet. Based on successful completion of such authentication measures, the app may then allow the user a level of access to the group digital wallet.

Figure 14:
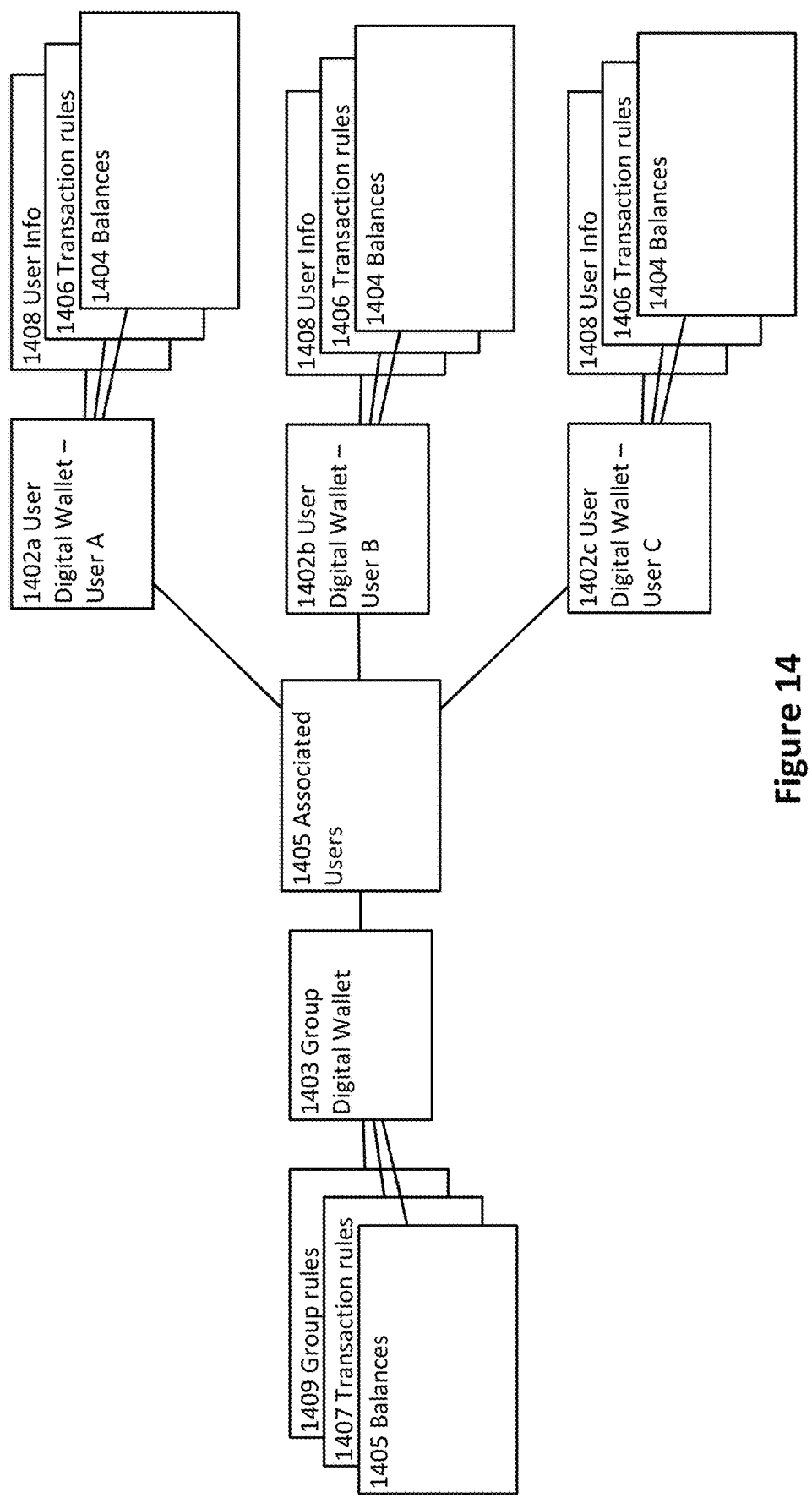
FIG. 14 depicts an example of a group digital wallet data structure.

Group digital wallets may have group policy rules that may govern how each user associated with a group digital wallet may interact with that group digital wallet. The digital wallet management system that manages group digital wallets may reference such group policy rules when evaluating or determining whether a particular transaction is to be processed (or to determine how to process a particular transaction). FIG. 14 depicts an example of a group digital wallet data structure. In FIG. 14, a group digital wallet 1403 is shown. The group digital wallet 1403 may be associated with a plurality of users 1405, each of which may, in turn, be associated with a corresponding user digital wallet 1402 (1202a, 1402b, 1402c, for example). Each user digital wallet 1402 may, in turn, be associated with a plurality of datasets, e.g., a user information dataset 1408, a user digital wallet transaction dataset 1406, and a balance data set 1404. The group digital wallet 1403 may also be associated with its own set of group policy rules, which may be analogous to the transaction rules 1406 that are used with the user digital wallets 1402, but which are applied to group digital wallets 1403 instead. Group digital wallets may also include a dataset for tracking balance information 1405 related to the group digital wallet 1403. Such datasets may, for example, be managed or accessed through a digital wallet management system similar to that discussed above with respect to FIG. 3.

Group policy rules may be established through a number of different ways—for example, some group policy rules for a group digital wallet may be created based on inputs received from one or more users associated with the group digital wallet. Other group policy rules may be put in place by the manager of the digital wallet management system. For example, a casino may wish to hold a fundraiser in which teams of players are invited to compete, with 5% of each team's net gains playing wagering games donated to a charity. In such an example, the digital wallet management system manager may create a group policy rule that is applicable to group digital wallets created for such an event that causes the digital wallet management system to a) monitor the amount that each team player transfers from such a group digital wallet to an EGM for a play session and the amount that is then transferred back to that group digital wallet at the conclusion of the player's play session on the EGM, b) determine an amount of net gain or net loss for each such play session, and c) divert 5% of any such net gains to, for example, a digital wallet associated with the charity or to a balance for a social responsibility currency in the group digital wallet.

Another example of group policy rules may include a group policy rule or rules that allow a user to transfer an amount of one currency type from a balance of a group digital wallet to a user digital wallet associated with that user but prevents the user from transferring an amount of another currency type from another balance of the group digital wallet to the user digital wallet associated with that user. For example, a group of friends may wish to engage in wagering game play, but do not have the time to actually travel to a city with a casino; one of the friends may, however, have a retired uncle who lives in that same city and enjoys playing wagering games but does not have a large amount of disposable income. The friends may establish a group digital wallet that includes the friends and the uncle as authorized users thereof. One or more group policy rules may be established that a) permit the uncle to transfer any amounts of one or more types of indirect hard currency, e.g., Bev-Bucks or GrubBucks, from one or more balances of the group digital wallet to corresponding balances in his own user digital wallet, b) prevent the uncle from transferring any amounts of one or more balances in other types of currency from the group digital wallet to his user digital wallet, c) permit any of the friends to engage in a transfer of an amount of a direct hard currency from a balance of the group digital wallet to a user digital wallet associated with that friend, d) prevent any of the friends from engaging in a transfer of an amount of any of the indirect hard currency types that the uncle is permitted to transfer, and/or (e) permit the uncle to engage in transactions with EGMs using one or more amounts of a direct hard currency balance of the group digital wallet for the purpose of playing wagering games. Such group policy rules may allow, for example, the friends and the uncle to enter into an easily-managed arrangement in which the friends contribute direct hard currency amounts to the group digital wallet for the uncle to then use when he goes to the casino where he lives; any winnings from the uncle's wagering game play at the casino may be distributed by currency type within the group digital wallet when the uncle concludes a wagering game session at the casino. Any direct hard currency winnings may be directed to the corresponding direct hard currency balance(s), and any indirect hard currency winnings such as GrubBucks or BevBucks, may be directed to their corresponding balances in the group digital wallet. The uncle may be allowed to withdraw any amount of such indirect hard currency for the purposes of purchasing food or drink at the casino and gets to enjoy playing wagering games, but does not have to worry about potentially losing any of his own money in doing so. Similarly, the friends may get to receive any winnings that the uncle may obtain in the form of direct hard currency (as well as potentially other types of currencies as well, e.g., soft currencies, redeemables, etc.), but do not have to waste time or resources travelling to the casino to play the wagering games in order to potentially win such benefits. In a similar scenario, a group of friends may generally all be of a similar rank in a loyalty program offered by a casino, but one of the friends may be several ranks lower than the others. In this case, the group of friends may cause a group digital wallet to be established with group policy rules in place that cause each player to share equally (or in a pro-rated fashion based on their contributions to the group digital wallet resource pool) in the winnings and losses of that accrue through the use of assets managed using the group digital wallet except that there may be a group policy rule or rules that cause any winnings of loyalty points to be transferred to the player that is ranked several ranks below the other players, thereby allowing the lower-ranked player to more easily catch up to their friends' ranking in the loyalty program.

It will be appreciated that such group policy rules or similar such group policy rules may, in a general sense, allow restriction of which balances of a group digital wallet one or more particular users may be allowed to use a) in particular transactions with various entities, b) in transactions to their own user digital wallets, or c) in transactions within the group digital wallet (for example, a player may be restricted from exchanging any amount of any quantity of a currency balance for an amount that is to be added to a social responsibility currency balance). For example, some group policy rules may limit the most users associated with a group digital wallet to a strictly passive role, permitting only a limited number of such users to engage in transactions using the balances of the group digital wallet. Such group policy rules may be useful, for example, in situations in which group digital wallet is used to provide funds for a "champion" or "championship team" to use in wagering game play. In such a scenario, group digital wallets may be established for individual champions or the individuals on championship teams, and other individuals, e.g., fans, friends, etc. of the champions or individuals on the championship teams, may be permitted to become associated with the group digital wallet for a particular champion or championship team. Such individuals, which may be referred to herein as spectator users, may, for example, be required to contribute a minimum amount of resources, e.g., $10, to such a group digital wallet in order to be allowed to associate with that group digital wallet and may be subject to group policy rules that prevent them from actively taking any actions with respect to the group digital wallet aside, for example, possibly being able to view balances of the group digital wallet and/or view the identities other people associated therewith. The spectator users for a group digital wallet may be entirely prohibited by the group policy rules from, for example, transferring amounts of currency from the group digital wallet to an EGM for play of a wager game. At the same time, group policy rules may restrict how the other users, i.e., the champion or championship team members, may utilize the resources of the group digital wallet with which they are associated. For example, a group policy rule or rules may designate only particular types of wagering games that the champion or championship team members may play using the resources of a particular group digital wallet, and may prevent the champion or championship team members from engaging in other types of transactions with such funds, e.g., prevent the champion or championship team members from exchanging between currency types, transferring funds to other digital wallets, etc. Further group policy rules may be configured to govern how the accumulated resources of the group digital wallets are distributed to both the champion or championship team members and the spectator users. For example, a group policy rule or rules may be established to distribute whatever currency amounts have accumulated in such a group digital wallet at the end of a particular period of time, e.g., at the end of each month. Such distribution may, for example, be caused to distribute a first portion, e.g., 10% of the balance totals in the group digital wallet, to a user digital wallet or wallets of the champion or members of the championship team, and to distribute a second portion, e.g., 90% of the balance totals in the group digital wallet, to a user digital wallet or wallets of the spectator user or users for that group digital wallet. Such group policy rules may, for example, be used to allow players to pool their resources to "invest" in a particular individual (a champion or championship team member) who a) may have more time and energy to play wagering games than the spectator users and b) may tend to achieve better returns when playing wagering games than the spectator user. The spectator user's investment is used to provide a credit pool that the champion or championship team member may utilize for the purposes of playing wagering games, and the champion or championship team members provide an investment in the form of their time (they may also contribute monetarily, in some cases) which they use to play the wagering games. At the end of the "investment period," i.e., when the balances in the group digital wallet are distributed to the spectator players and the champion or championship team players, the various parties each reap some reward. Additional group policy rules may be used to further customize how such group digital wallets are used, e.g., there may be additional group policy rules that may govern how spectator and/or champion or championship team member distributions from the group digital wallet are implemented. For example, a group policy rule or rules may cause funds that are distributed from such a group digital wallet to spectator users' individual user digital wallets to be distributed on a pro-rated basis to each such spectator user's user digital wallet based on the proportion of that spectator user's "buy-in" contribution to the group digital wallet as compared with all of the other spectator user's "buy-in" contributions. It will be understood that reference to "champion" or "championship" team in this discussion does not necessarily mean that such individuals have won a particular championship event—they may simply be individuals who are willing to act, in effect, as surrogates, agents, or other individuals that may act on behalf of the spectator users.

Another example of group policy rules that may be established may govern the timing and manner of how players associated with the group digital wallet are able to transfer funds from the group digital wallet back to their own individual user digital wallets. For example, there may be one or more group policy rules that a) cause all quantities of currency in a group digital wallet to be distributed to the user digital wallets of users associated with the group digital wallet at a predetermined time and b) cause those quantities of currency to be evenly distributed to such user digital wallets. Thus, for example, a group of friends who decide to pool resources in a group digital wallet for a weekend trip to a casino can play wagering games collectively during their trip using the group digital wallet and then, at the conclusion of the weekend, have the resources remaining in the group digital wallet be automatically distributed between them.

In another similar example, the distribution of amounts of a quantity of currency from a group digital wallet may be directed to be in different amounts for different players, i.e., the group policy rules may direct that a larger portion of a quantity of a currency in a group digital wallet be transferred to the user digital wallet for a first player as compared with the portion of that quantity of currency that is transferred to the user digital wallet for a second player. For example, if four friends pool resources and the first three friends each contribute $100 of direct hard currency to the group digital wallet while the fourth friend contributes $200 of direct hard currency, then the friends may establish a group policy rule that causes whatever currency balances remain in the group digital wallet at a particular time to be distributed in a pro-rated manner according to the amounts of their initial contributions, i.e., the first three friends will each have 20% of the currency balance(s) in the group digital wallet transferred to their user digital wallets, and the fourth friend will have 40% of the currency balance(s) in the group digital wallet transferred to their user digital wallet.

Still other types of group policy rules may establish rules that may allow users associated with a group digital wallet to have more flexibility in choosing when to transfer funds from a group digital wallet. In the above scenarios, for example, group policy rules are provided that automatically cause disbursements from the group digital wallets discussed to occur at a particular time for all users associated with such group digital wallets. In other scenarios, a group policy rules may allow for players to control the timing of when such disbursements may occur. For example, a group digital wallet may have an associated group policy rule or rules that permit a player to "cash out" from the group digital wallet at an arbitrary time. In such a scenario, the group policy rules may cause a portion of the current quantity of currency or quantities of currencies in a group digital wallet to be transferred to the user digital wallet for that player on a pro-rated basis. In one similar scenario, group policy rules may be established for a group digital wallet that causes a "cash out" from the group digital wallet for a particular player to be initiated if they leave a geo-fenced area that includes the casino where the players associated with the group digital wallet are playing wagering games.

In yet another scenario, as discussed earlier, a group policy rule or rules may be established that cause a percentage, e.g., 5%, of any gains that arise in a group digital wallet through wagering game play sessions to be transferred to a social responsibility currency balance (or directly to a particular charity or non-profit organization). In a further example, such a group policy rule or rules may include a further group policy rule that causes such a diversion of funds from such gains to a social responsibility currency balance (or charity or non-profit) to only occur if the non-social responsibility currency balance(s) in the group digital wallet at the time the gain is to be added to the balance(s) of the group digital wallet exceed or equal or are equivalent to a starting balance or balances in the group digital wallet. For example, consider four users that are associated with a group digital wallet and have each transferred $100 of direct hard currency into a corresponding direct hard currency balance of the group digital wallet for use as a starting balance; this group digital wallet has a group policy rule or rules directing diversion of 5% of each net gain for the group digital wallet that arises from a wagering game play session to a social responsibility currency balance of the group digital wallet. One of the players then ends a wagering session after having experienced a net gain of $100 during the wagering session; this $100 gain is then transferred back to the group digital wallet. If the balance of direct hard currency in the group digital wallet at this time is $300 or $350, then the $100 gain will be added to the direct hard currency balance of the group digital wallet without any diversion of a portion thereof to a social responsibility currency balance in the group digital wallet. If the balance of the direct hard currency in the group digital wallet at this time is $400 or $450, then $95 of the $100 gain will be added to the direct hard currency balance of the group digital wallet and $5 will be diverted to the social responsibility currency balance in the group digital wallet.

In another variation, such a rule may only divert a percentage of a gain to a portion of the gain that would, when added to a balance of a group digital wallet, cause the balance or balances of the group digital wallet to exceed such a starting balance. For example, in the scenario outlined above, if the balance of direct hard currency in the group digital wallet at the time of the $100 net gain is $350, then $50 of the $100 gain would be added to the direct hard currency balance of the group digital wallet without any diversion of a portion thereof to the social responsibility currency balance in the group digital wallet, but the remaining $50 of the $100 gain would be subject to diversion, i.e., $2.50 of the $100 gain would be diverted to the social responsibility currency balance for the group digital wallet, with $97.50 of the $100 gain being routed to the direct hard currency balance.

In yet another charitable giving scenario, a group policy rule or rules may simply cause a portion of one or more balances of a group digital wallet to be transferred to a social responsibility currency balance (or a charity or non-profit) at the time that the group digital wallet balances are to be distributed among the users associated with the group digital wallet. For example, a group policy rule or rules may direct that whenever a particular user "cashes out," X % of their cash-out amount be diverted to a social responsibility currency balance of the group digital wallet, thus reducing the player's cash-out amount accordingly. In an alternative but similar group policy rule or rules, X % of the player's cash-out amount may be caused to be diverted into a social responsibility currency balance in the player's user digital wallet, thereby potentially affording the player more control with how that social responsibility currency balance is to be used going forward.

Another example of a group policy rule or rules is one in which a group policy rule or rules limit the frequency and/or amount with which users associated with a group digital wallet may use or spend resources managed in the group digital wallet. For example, a group policy rule or rules may generally limit each player to spending or using group digital wallet balances only for the purposes of playing wagering games located in a particular casino. Such a group policy rule or rules may also, in some implementations, further limit each player associated with the group digital wallet to transferring no more than $50 per hour from the group digital wallet to one or more EGMs offering wagering games for play. A variation on such a group policy rule or rules may limit a player to transferring no more than a net amount of currency, e.g., $50, per unit time, e.g., hour. Thus, if a player transfers $50 to an EGM at 1:00 PM for a gaming session and then ends the gaming session at 1:30 PM with only $40 remaining (which are then returned to the group digital wallet), the player may, at 1:40 PM, transfer $40 from the group digital wallet to another EGM for further play of wagering games (but may not be allowed to transfer $50 to such an EGM at that time). Such time-based amount restrictions may be implemented based on timers that evaluate such periods in a variety of ways. In some implementations, the time periods within which players are limited in the amount of transfers from group digital wallets to EGMs that can be made may be evaluated based on a fixed schedule, e.g., each consecutive 1-hour period over the course of a day (midnight to 1:00 AM, 1:00 AM to 2:00 AM, etc.) In other implementations, the time periods may be floating, e.g., a corresponding timer may be started at each such transfer, and the total amount transferred by a player while any timer for transfers initiated by such a player is still within the time limit may be limited to the prescribed amount. For example, with regard to the scenario above, if a player transfers $30 to an EGM at 1:00 PM, a 1-hour timer may be started in conjunction with that transfer. At 1:20 PM, the player transfers another $10 to the EGM, and at 1:40, the player transfers yet another $10 to the EGM; the player will not be allowed to transfer further funds to the EGM from the group digital wallet until 2:00 (when the 1-hour timer for the initial $30 transfer expires). At 2:00, the group policy rule or rules may allow the player to transfer up to $30 to the EGM. Put more generally, such a group policy rule or rules may cause a timer of a certain duration to be started in association with each transfer of funds from a group digital wallet to, for example, one or more EGMs. The group policy rule or rules may prevent a player from transferring more than a certain total amount, evaluated with respect to the total of all amounts transferred by that player that still have unexpired timers and adjusted by any amounts transferred by that player into the group digital wallet in association with such transactions (for example, if the above player were to have transferred $5 back to the group digital wallet at 1:35 PM, then the group policy rule or rules may allow the player to transfer up to $15 at 1:40).

Another example of a scenario in which a group policy rule or rules may be utilized is when a group of players wish to pool resources in a group digital wallet but wish to restrict any of a variety of aspects of wagering games that the players may play (or other transactions that players may engage in) using resources of the group digital wallet. For example, the players may wish to limit one or more of: the maximum wager size that players may make in a wagering game, the type of wagering game the players may play (e.g., only bingo-type or class II games, only class III games, only video poker games, etc.), the specific wagering game or games that the players may play (for example, only Buffalo-themed games offered by Aristocrat, such as Buffalo Diamond, Buffalo Golden 7, Buffalo Grand, Buffalo Ignite, Buffalo Inferno, Buffalo Max, Buffalo Thundering 7s, etc., or only a specific wagering game such as Buffalo Grand), the frequency with which the funds transferred to a wagering game are transferred back to the group digital wallet, the locations of EGMs (or business entities at which group digital wallet users may be allowed to make purchases) to which the players may transfer funds from the group digital wallet (for example, the players may be restricted to transferring funds from the group digital wallet to only EGMs that are located within a geo-fenced area), etc. In some such instances, the group policy rule or rules may cause instructions to be provided, e.g., by the digital wallet management system, to a wagering game EGM in tandem with transferring funds to that EGM. Such instructions, for example, may include instructions or configuration parameters that may cause the EGM in question to alter one or more parameters or settings that govern how the EGM operates. For example, if a group policy rule or rules is configured to limit the wager size that players may use, instructions may be provided to such an EGM that cause the EGM to change one or more parameters regarding wager sizes that the player will be allowed to make so that the wager limit is enforced. In another example, the EGM may be instructed to automatically conclude a gaming session after a certain period of time, e.g., 1 hour, and transfer the remaining player balance on the EGM to the group digital wallet.

In another example of a group policy rule or rules, transfers of amounts of currencies from a group digital wallet may be restricted in some implementations to only be permitted when a user associated with the group digital wallet (or, at least, a device associated with that user, e.g., a smartphone) is within a particular geo-fenced area. For example, a user associated with a group digital wallet may be required to be within a geo-fence, as reported by the location of the user's smartphone that may have an app for interfacing with the digital wallet management system, that is within a geo-fence associated with one or more casino properties. Thus, while a user may associate with a group digital wallet in order to allow another user associated with the group digital wallet to wager on their behalf while the user is at work (and not wagering), the user may not be able to actually transfer any share of the winnings that the other user may obtain from the group digital wallet to the user's user digital wallet unless the user takes the time to travel to, for example, a casino within a geo-fenced area. It will be appreciate that any technique that may provide an indication of a user's location may be used instead of geo-fencing in the location-based scenarios discussed herein.

As mentioned earlier, group digital wallets may include both user-definable group policy rules and/or manager-defined group policy rules. In some implementations, a digital wallet management system may be configured to offer users the option to create a group digital wallet based on various pre-configured templates, e.g., a "team play" template in which group digital wallet members contribute resources to the group digital wallet and share equally (or in proportion to their contributions of resources) in the gains or losses that accrue to the balance(s) that is managed by that group digital wallet, a "charity" template which is similar to the "team play" template but which allows a user or users associated with such a group digital wallet to designate a percentage of their winnings that may be diverted to a social responsibility currency balance or charity or nonprofit (either user-selected or manager-selected), a "champion" template which implements group policy rules similar to those discussed earlier with respect to the champion or championship team scenario, etc. A user configuring a group digital wallet may select one of these templates, possibly modify it or adjust various parameters therein (for example, in a "charity" template, the user may adjust the percentage of user's winnings that is to be diverted to the social responsibility currency balance) if permitted by the template, and then invite other users to join the group digital wallet.

Digital wallet management systems may also be configured, in some implementations, to send notifications or messages to users associated with a particular group digital wallet based on events that are associated with the group digital wallet and/or the other users associated therewith. Such notifications, for example, may be sent by text message, app notifications (for example, a notification generated by a digital wallet app installed on users' smartphones), etc., and may provide information that is relevant to users' association with the group digital wallet. For example, the digital wallet management system may cause all users associated with a group digital wallet to be notified when a significant events occur with respect to one or more balances managed by such a group digital wallet, e.g., when a new user becomes associated with the group digital wallet and contributes an initial amount of currency to the group digital wallet, when a user makes a further transfer of an amount of currency from the user's user digital wallet to the group digital wallet, when a user transfers an amount of currency from the group digital wallet to the user's user digital wallet, when a user causes an amount of currency from the group digital wallet to be transferred elsewhere (to an EGM, to a vendor, etc.), when a user causes an amount of currency to be transferred into the group digital wallet from an entity or location other than the user's user digital wallet (for example, when a user ends a wagering game session and the EGM they were playing on transfers their remaining balance to the group digital wallet), when a balance of currency managed in the group digital wallet exceeds a predetermined amount (e.g., when a balance of currency in a group digital wallet exceeds $1000, $10,000, $100,000, etc.), when a user that is using funds from the group digital wallet for wagering game play on an EGM experiences a particular gaming event (e.g., a big win, a jackpot win, a bonus game trigger, etc.), and so forth.

Multi-currency and group digital wallets may be used in a variety of contexts. Group digital wallets may generally be used interchangeably with user-specific digital wallets in both single-currency and multi-currency contexts. In some instances, multi-currency digital wallets (and group multi-currency digital wallets may be used to engage in transactions with equipment or devices that are configured to accept or output more than one type of currency. For example, in some implementations, an EGM may be configured to provide awards that are in more than one type of currency during play of the EGM. Thus, for example, such an EGM could, for any given play of a wagering game offered thereupon, potentially provide an award in one currency type, another currency type, or both currency types. It will be understood that while this example, as well as the following discussion, focuses on a multi-currency EGM that is configured to provide awards in one or both of two types of currency, other similar multi-currency EGMs may be configured to provide awards for even larger numbers of different types of currency, e.g., 3, 4, 5, etc. different types of currency.

Multi-currency EGMs may largely operate in a manner similar to single-currency EGMs, with some notable exceptions. Single-currency EGMs, it will be understood, refer to EGMs that typically operate using only direct or indirect hard currencies. For example, multi-currency EGMs may maintain multiple meters or sets of meters for the various different currencies that are used to track wagers and/or awards for the various currencies used by such a multi-currency EGM. From a player standpoint, this may manifest in the form of separate displays of the total credits or units of each currency that the player currently has on such an EGM. For example, if a multi-currency EGM allows for play using both monetary credits, e.g., credits that are generally equivalent to direct hard currency, and soft currency, e.g., credits that are generally usable in an online social gaming platform, there may be separate indicators of the player's balance in both such currencies on the EGM.

Another difference between multi-currency EGMs and traditional, single-currency EGMs is that multi-currency EGMs may reference separate pay tables for each of the different types of currencies. A pay table, as the term is used herein, is a data structure that defines which particular results for a wagering game may result in awards (and what such awards will be).

For clarity, a "result," as the term is used herein at least with respect to multi-currency EGMs, refers to a pattern or other indication that is defined by an outcome and which may be linked to one or more payouts. In a reel-based game, for example, if a 3-in-a-row pattern of a particular symbol yields a payout of $100, then the 3-in-a-row pattern is a "result," and any outcome that includes the 3-in-a-row pattern would include that result. In some instances, multiple results may be defined by a single outcome, e.g., an outcome might include two 3-in-a-row patterns and one 4-in-a-row pattern, i.e., 3 results.

Similarly, for clarity, an "outcome," at least as the term is used herein to refer to outcomes with respect to multi-currency EGMs, refers to the outcome of a wagering game for a given wager that determines zero or more results. For a reel-based wagering game, the outcome for a spin/wager would, for example, be representative of all the symbol positions on the reels at conclusion of the spin. Such symbols may, depending on the particular results defined by that outcome, cause one or more payouts to occur. In reel-based wagering games, the positions of the symbols on the reels may be determined by a randomly generated number; in such cases, for example, the randomly generated number may be viewed as representative of the symbol positions and may thus also be thought of as the outcome.

FIG. 15 depicts two example multi-currency pay tables (these pay tables are shown as one consolidated table, but may also be stored as two completely separate pay tables, with each pay table having a corresponding result data and award data for a different currency, e.g., currency A and currency B in this example). FIG. 16 shows a reel display for a 5-reel slot-machine-type wagering game, as well as various symbols that may be present on each reel; the pay table of FIG. 15 depicts various winning result combinations for such a wagering game.

As can be seen in FIG. 15, the multiple pay tables may allow for a variety of different win conditions. For example, the first eight rows of the pay table indicate that achieving the results indicated will cause the player to be presented with the awards of the indicated amounts in currency A, but no awards in currency B, e.g., achieving a result of 3 lemon symbols in a row, such as is shown in FIG. 17, will result in the player being awarded 120 units of currency A and zero units of currency B.

Similarly, the last eleven rows of the pay table indicate the opposite, i.e., that achieving a result listed in these rows will cause the player to be presented with an award of currency B, but no award of currency A. For example, achieving a result of two peaches in a row, e.g., as shown in FIG. 18, will result in the player being awarded 20 units of currency B and zero units of currency A.

Another win condition that may occur is shown in FIG. 19, in which a result with four strawberry symbols in a row is depicted; this result correlates with award amounts in both currencies, i.e., 120 units of currency A and 5 units of currency B.

It is also possible for multiple winning result patterns to be obtained for the same reel outcome for such a wagering game; such multiple winning results may be for results in a pay table for the same currency or in pay tables for different currencies, e.g., as shown in FIG. 20. In FIG. 20, a first result of three banana symbols in a row has been achieved, which correlates with a payout of 100 units of currency B. However, the same reel outcome has also produced a winning result of two lemon symbols in a row, which correlates with a payout of 100 units of currency A.

Figure 21:
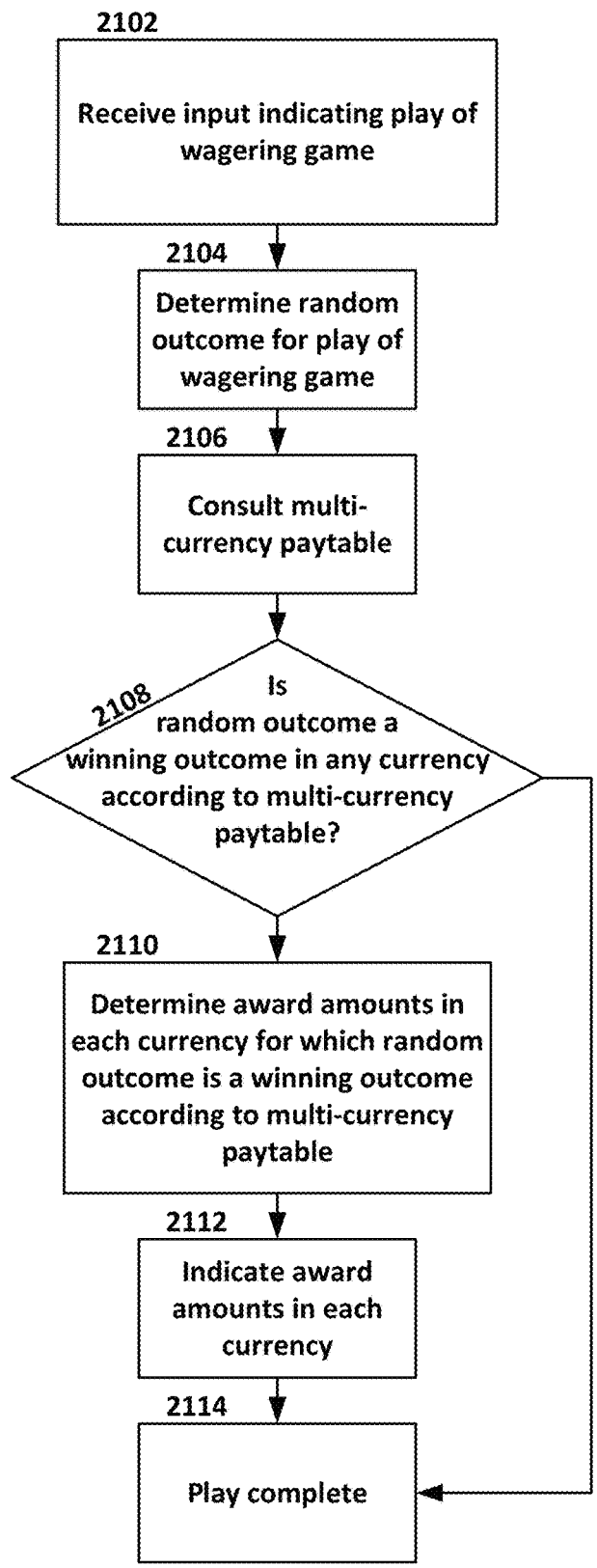
FIG. 21 depicts a flow diagram for a multi-currency wagering game play.

FIG. 21 depicts an example game progression flow diagram for a multi-currency EGM. In block 2102, an input may be received by the EGM indicating a play of the wagering game offered by the EGM. Such an input may, for example, be provided by a player pushing a "Play" button or control on the EGM.

In block 2104, the EGM may determine a random outcome associated with the play of the wagering game. Such an outcome may be determined locally, e.g., using a random number generator provided on the EGM or may be obtained from a central server that has random number generators that provide random outcomes to multiple EGMs on request.

In block 2106, the EGM may consult a multi-currency paytable (or multiple paytables, each having a different currency associated therewith); such a paytable (or paytables) will generally specify one or more winning outcomes for each currency type associated with the paytable. As a result, a multi-currency paytable (or equivalent) will specify at least one award amount in each currency associated therewith for a corresponding one or more winning outcomes—some such outcomes may even be associated with multiple award amounts in different currencies.

In block 2108, a determination may be made as to whether the random outcome is a winning outcome in any currency according to the multi-currency paytable. If not, the technique may proceed to block 2114, where the play of the game may be considered complete. If the random outcome does correspond to a winning outcome in any currency according to the multi-currency paytable, however, the technique may proceed to block 2110, in which the award amount in each currency for which the random outcome is considered to be a winning outcome per the multi-currency paytable may be determined. In block 2112, the award amount for each currency where the random outcome was determined to be a winning outcome may be indicated to the player, e.g., through increasing an on-screen credit or currency meter for that currency, providing animations, etc. The technique may then progress to block 2114, where the play may be considered to be complete. If the player provides a further input to play the wagering game, the technique may return to block 2102.

Figure 22:
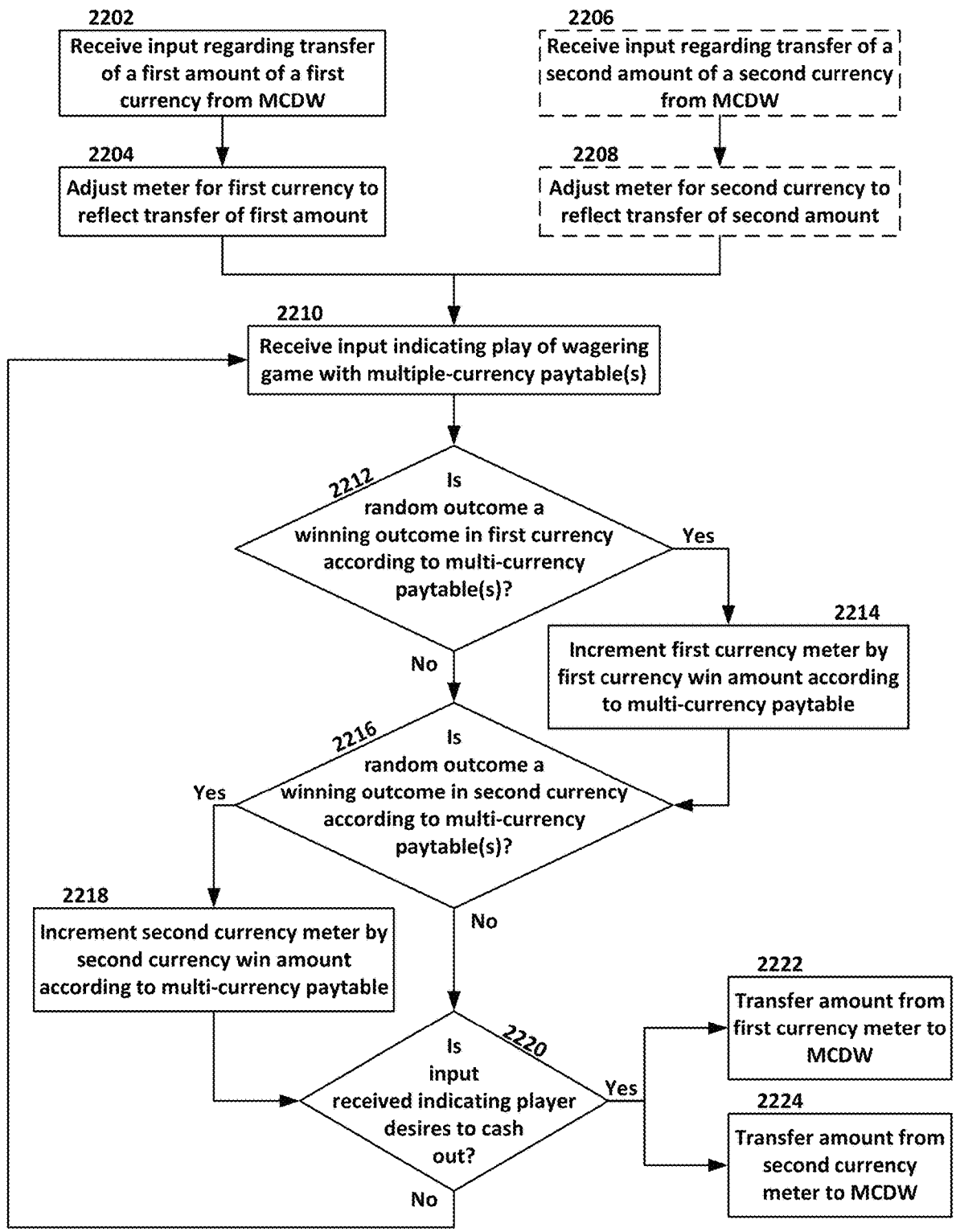
FIG. 22 depicts a further flow diagram for multi-currency wagering game play in conjunction with the use of a multi-currency digital wallet.

FIG. 22 depicts another flow diagram providing a high-level overview of how a multi-currency EGM with a multi-currency paytable may interact with a multi-currency digital wallet. For example, in block 2202, the multi-currency EGM may receive input indicating a transfer or credit of a first amount of a first currency, e.g., a hard currency or a gaming machine credit currency that may be fungible for hard currency, from a multi-currency digital wallet associated with a player. In block 2204, a meter associated with the first currency may be incremented to reflect the transfer of the first amount. For example, if the player transfers $100 USD of hard currency to the EGM, then the first meter may be incremented to reflect a corresponding amount, e.g., 100 credits if the EGM denomination is 1 credit/$1 or 1000 credits if the EGM denomination is 1 credit/$0.10.

In block 2206, the multi-currency EGM may optionally receive input indicating a transfer or credit of a second amount of a second currency, e.g., a soft currency, from the multi-currency digital wallet associated with the player. In block 2208, a meter associated with the second currency may be incremented to reflect the transfer of the second amount, e.g., similar to how the meter associated with the first amount was incremented. It will be understood that in some implementations, the multi-currency EGM may be configured to either not require or not even support a transfer of an amount of the second currency to an associated meter of the multi-currency EGM. For example, in some instances, a multi-currency EGM may only accept wagers placed using credits or currency amounts from the meter for the first currency and may not accept wagers placed using credits or currency from the meter for the second currency. In such implementations, there may be no need for or benefit from having an initial positive balance indicated by the meter for the second currency. Accordingly, blocks 2206 and 2208 may be optional.

In block 2210, input may be received by the multi-currency EGM indicating a play of a wagering game that uses a multi-currency paytable. The input, for example, may indicate that a wager has been placed or that the player has pressed, for example, a "play" button. The input received may also be associated with a wager amount that is associated with one or both of the meters associated with the first and second currencies. For example, each play of the wagering game may require a wager of 1, 2, 3, 5, or 10 credits (or some other number of credits) from the meter(s) associated with the first currency and/or the second currency (in some implementations (or some combination thereof, e.g., one credit from each meter), as noted above, the EGM may only accept wagers placed using credits from a meter associated with a subset of the currencies, e.g., the first currency. Regardless, the meter or meters from which credits were used to place the wager may be caused to be decremented to reflect the placement of the wager. Responsive to the input indicating a play of the wagering game, the multi-currency EGM may, as discussed above with respect to FIG. 21, determine a random outcome for the wagering game. The multi-currency EGM may then, in block 2212, determine if the random outcome corresponds to a winning outcome in the first currency according to the multi-currency paytable(s) used by the multi-currency EGM. If, so, then the meter associated with the first currency may be incremented by an amount indicated by the multi-currency paytable for the first currency in block 2214 before the technique proceeds to block 2216; if not, then the technique may simply proceed to block 2216 directly. In block 2216, a similar determination as was made in block 2212 may be made with respect to the second currency; if it is determined in block 2216 that the random outcome is a winning outcome with respect to the second currency, then the meter associated with the second currency may be incremented in block 2218 by an amount indicated by the multi-currency paytable for the second currency before proceeding to block 2220. If it is determined in block 2216 that the random outcome does not correspond with a winning outcome for the second currency, then the technique may proceed to block to block 2220, where a determination may be made as to whether a further input is received indicating that the player wishes to cash out of the EGM. If not, then the technique may return to block 2210, where a further input indicating a play of the wagering game may be received. If so, then the technique may proceed to block 2222, where the multi-currency EGM may cause an amount of the first currency corresponding with (or based on) the amount in the meter associated with the first currency to be transferred to the player's multi-currency digital wallet, and to block 2224, where the multi-currency EGM may cause an amount of the second currency corresponding with (or based on) the amount in the meter associated with the second currency to be transferred to the player's multi-currency digital wallet. For example, if the meter associated with the first currency indicates 532 credits and the denomination is $0.10/credit and the first currency is US dollars, then the EGM may transfer an amount of $5.32 USD to the multi-currency digital wallet. Similarly, if the meter associated with the second currency indicates 430 credits and the denomination is 1 current unit/credit and the second currency is, for example, a social gaming virtual currency, then 430 units of the virtual currency may be caused to be transferred by the EGM to the multi-currency digital wallet.

It will be understood that the above operations may be performed in other orders as well, e.g., blocks 2212 and 2216 may be performed in parallel instead of serially, or in reverse order. It will also be understood that, if desired, a player may provide input indicating a desire to cash out at any time, and that blocks 2222 and 2224 may be performed responsive to such input even if received while waiting for further player input indicating a play of the wagering game.

In some implementations, the currency types used in a multi-currency EGM may be selected to include a standard currency, e.g., a form of hard currency, as well as a non-standard currency, e.g., a soft currency. In this example, for instance, currency A may be direct hard currency (and/or indirect hard currency, e.g., marketing credits and/or promotional credits), and currency B may be a soft currency typically used on an online social gaming platform. Some such multi-currency EGMs may have pay tables that are generally configured to feature complementary award combinations, e.g., when the player wins an award in one currency, they may not win an award in the other currency or currencies, or may win an award in the other currency or currencies that is much smaller, e.g., one, two, three or more orders of magnitude smaller (in terms of general equivalent worth), than the award won in the first currency. Such implementations may provide players with a consolation prize, for some results, in the form of the second currency when they fail to win an award in the first currency with such results (or if they win a small-value award in the first currency). Another potential difference between multi-currency EGMs and single-currency EGMs is that multi-currency EGMs may, in some implementations, feature distinctive award presentations. In particular, some multi-currency EGMs may use different types of graphical display effects to highlight or draw attention to patterns that have corresponding awards in different pay tables of the multi-currency EGM. An example of such graphical display effects is provided in FIGS. 23 through 25.

Figures 23, 24, 25:
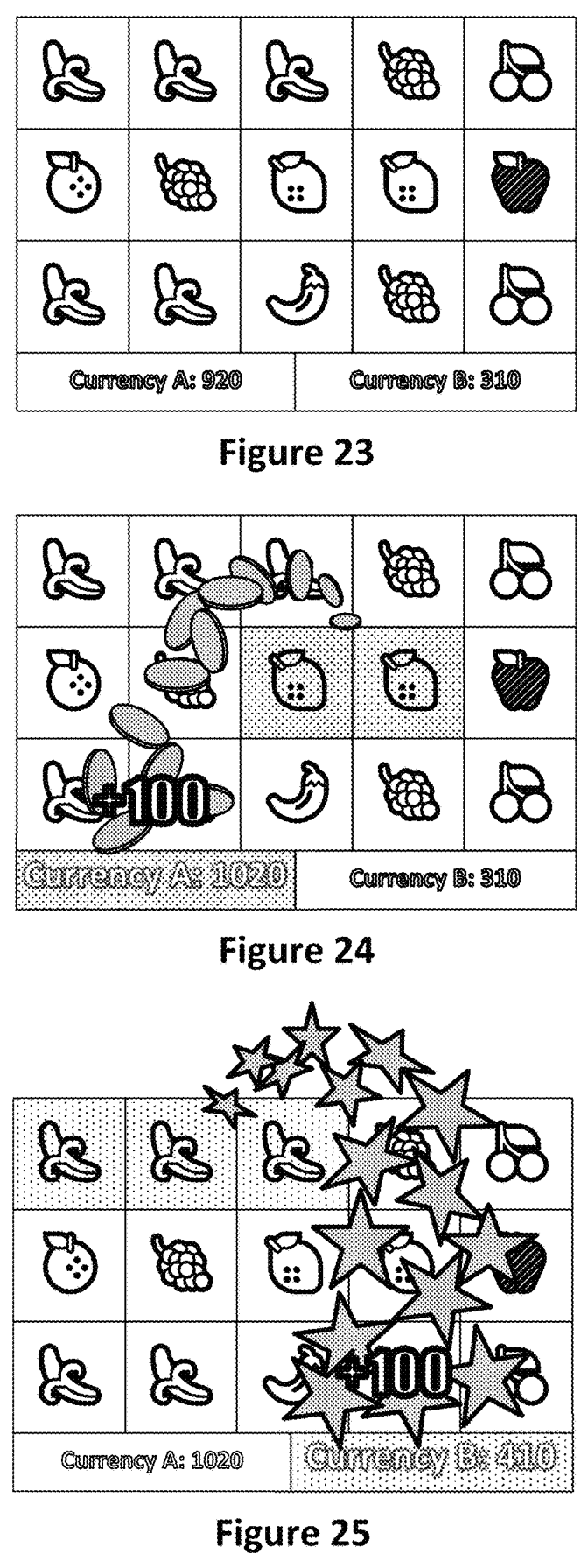

FIG. 23 depicts a GUI for a multi-currency wagering game; the wagering game is a 5-reel slot machine game, with three symbols from each reel being shown at a time.

The multi-currency wagering game provides credit balances in two currencies: Currency A and Currency B. Currency A in FIG. 23 has a value of 920 units, and Currency B in FIG. 23 has a value of 310 units. The pay tables that are in use are identical to that shown in FIG. 15. As can be seen, the outcome of the reels shown in FIG. 23 includes two results that are associated with different awards in the pay table of FIG. 15.

In some implementations, in order to make it easier for a player to discriminate between awards in each currency type, different graphical effects may be used to highlight awards in one currency than to highlight awards in another currency.

For example, the graphical effects may be different from each other because they are staggered in time, e.g., a graphical effect (such as falling coins, pulsing auras around a winning result, glowing reel symbols in the winning result, etc.) for a first currency may be played first, thus highlighting the winning result(s) for the first currency, and a second graphical effect may be played after the first graphical effect has finished or nearly finished in order to highlight the winning result for the second currency.

In another example, the graphical effects used for each currency may appear different in some way, e.g., be different colors, feature different graphics, use different shapes, etc.

FIGS. 24 and 25 depict the wagering game GUI of FIG. 23, but with different graphical effects applied to highlight the winning result for each currency. In FIG. 24, a two-in-a-row lemon symbol pattern has caused a payout of 100 credits of currency A, which, in this example, is a direct hard currency, such as US dollars. To illustrate this award, the winning result of two lemon symbols has been highlighted by shading the reel stops displaying these symbols with a first background color and an animation of cascading coins has been applied as an overlay, giving the appearance that coins are springing out of the winning result and arcing down into the currency A meter. At the same time, a "+100" marker is shown to indicate the magnitude of the win, and the currency A meter text is caused to grow in size and increment to reflect the additional units of currency A that are being added to the meter.

After the animation for the currency A award is shown, a similar animation for the result of currency B may be caused to be presented. For example, the result of three banana symbols may result in an award of 100 units of currency B. To emphasize this winning result, the three reel stops showing the banana symbols may be shaded using a different background color than was used to shade the reel stops in FIG. 24. Additionally, another cascade animation may be shown, although in this example, the items that are cascading out of the winning pattern for currency B are stars, which may, for example, correspond with the symbol for currency B. As with currency A in FIG. 24, a "+100" marker has been added to the cascade animation to indicate the number of units of currency B that have been won, and the meter for currency B has been enlarged in font size and updated to reflect the won amount of currency B.

Thus, in the GUI of FIGS. 23 through 25, the winning results for currency A and currency B are shown separated in time as well as through different animations and background shading for the reel stops. It will be understood that such differentiated display of different currency awards may use other types of animations as well, and that some implementations may use only a subset of the different win highlighting techniques presented in FIGS. 23 through 25.

In some implementations, a multi-currency EGM may be configured to allow a player to transfer one or more types of credits to the EGM for play of a wagering game. For example, in a multi-currency EGM that provides outcomes in both US dollars and soft currency, e.g., social gaming points, a player may be allowed to transfer direct or indirect hard currency to the EGM and place bets therewith, but there may be no ability to transfer social gaming points to the EGM. However, at the conclusion of play, the EGM may allow the player to transfer any direct hard currency winnings obtained to the player's multi-currency digital wallet, but may also allow the player to transfer any social gaming points that may have been won to the multi-currency digital wallet as well. Thus, one type of currency may be provided by a player to a multi-currency EGM, but more than one type of currency may be output by the multi-currency EGM. In some such implementations, the EGM may not allow wagers to be placed in the units of one of the currencies associated with the pay table for that multi-currency EGM; for example, the EGM providing the wagering game of FIGS. 23 through 25 may allow the player to provide direct hard currency, e.g., US dollars, to the EGM and to place wagers in credits based on those US dollars, but may not allow the player to place any wager in the other currency or currencies that may be awarded by such an EGM. Thus, the other currency or currencies may simply act as another type of prize that may be won by a player on such an EGM.

In some other implementations, however, a multi-currency EGM may allow a player to transfer multiple types of currencies to the EGM. For example, in the EGM of FIGS. 23 through 25, the EGM may allow a player to transfer both hard currency, e.g., US dollars, and soft currency, e.g., social gaming points, to the EGM, thus providing non-zero amounts of credits for both currencies. In some such implementations, the EGM may allow for wagers to be placed in either currency or, in some instances, in both currencies simultaneously.

It will also be understood that while the above examples of multi-currency EGMs featured only two different currencies, the concepts discussed above can be extended to EGMs that utilize multi-currency paytables (or the equivalent) for more than two currencies, e.g., three, four, five, etc. currencies.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items. Similarly, the term "set" or "subset" should not be viewed, in itself, as necessarily encompassing a plurality of items—it will be understood that a set or a subset can encompass only one member or multiple members (unless the context indicates otherwise).

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A system comprising:
one or more processors;
one or more memory devices; and
one or more displays, wherein:
the one or more memory devices, the one or more processors, and the one or more displays are communicatively connected, and
the one or more memory devices store computer-executable instructions for controlling the one or more processors to:
obtain first paytable information that defines one or more payout amounts associated with a first currency for a first set of one or more results obtainable in a wagering game,
obtain second paytable information that defines one or more payout amounts associated with a second currency for a second set of one or more results obtainable in the wagering game, wherein the first currency and the second currency are different,
present the wagering game using at least one of the one or more displays,
receive one or more inputs,
cause a first wager to be placed in the wagering game using credits associated with at least the first currency responsive to receipt of the one or more inputs,
determine an outcome of the wagering game in association with the first wager, the outcome defining one or more first results, and
determine, for each first result that has at least one corresponding non-zero payout amount defined by the first paytable information or the second paytable information, at least one payout amount based on that first result and at least one of the first paytable information and the second paytable information.

2. The system of claim 1, wherein the one or more memory devices further store computer-executable instructions for further controlling the one or more processors to:
receive information indicating a transfer of a first currency amount of a first currency from a multi-currency digital wallet to an electronic gaming machine having the one or more displays;
adjust a first meter associated with the first currency by a first credit amount based on the first currency amount;
increment, for each first result that has at least one corresponding non-zero payout amount defined by the first paytable, the first meter based on that corresponding non-zero payout amount; and
increment, for each first result that has at least one corresponding non-zero payout amount defined by the second paytable, a second meter based on that corresponding non-zero payout amount, wherein the second meter is associated with the second currency.

3. The system of claim 2, wherein the one or more memory devices further store computer-executable instructions for further controlling the one or more processors to:
receive information indicating a transfer of a second currency amount of a second currency from the multi-currency digital wallet to the electronic gaming machine; and
adjust the second meter associated with the second currency by a second credit amount based on the second currency amount.

4. The system of claim 2, wherein the one or more memory devices further store computer-executable instructions for further controlling the one or more processors to:
receive input indicating a cashout request;
cause, responsive to receipt of the input indicating the cashout request, a transfer of an adjusted first currency amount from the electronic gaming machine to the multi-currency digital wallet, wherein the adjusted first currency amount is based, at least in part, on credits indicated by the first meter at the time the input indicating the cashout request is received; and
cause, responsive to receipt of the input indicating the cashout request, a transfer of an adjusted second currency amount from the electronic gaming machine to the multi-currency digital wallet, wherein the adjusted second currency amount is based, at least in part, on credits indicated by the second meter at the time the input indicating the cashout request is received.

5. The system of claim 1, wherein at least one of the first currency and the second currency is selected from the group consisting of: a direct hard currency, an indirect hard currency, a soft currency, a time-based currency, a game progression currency, an informational currency, a variable currency, a social responsibility currency, and a non-national digital currency.

6. The system of claim 1, wherein there is at least one result in the first set of results and the second set of results that has both a corresponding non-zero payout amount in the first currency and a corresponding non-zero payout amount in the second currency.

7. The system of claim 1, wherein there is at least one result in the first set of results and the second set of results that has both a corresponding non-zero payout amount in the first currency and a non-equivalent corresponding non-zero payout amount in the second currency.

8. The system of claim 1, wherein the one or more memory devices further store computer-executable instructions for further controlling the one or more processors to:
cause the one or more displays to indicate each first result that has a corresponding non-zero payout amount in the first currency using a first graphical effect, and
cause the one or more displays to indicate each first result that has a corresponding non-zero payout amount in the second currency using a second graphical effect, wherein the first graphical effect and the second graphical effect are different.

9. The system of claim 8, wherein the one or more memory devices further store computer-executable instructions for further controlling the one or more processors to:
cause the one or more displays to indicate the first result using the first graphical result and the second graphical result at different times for each first outcome that has both a corresponding non-zero payout amount in the first currency and a corresponding non-zero payout amount in the second currency.

10. The system of claim 1, wherein the first set of results includes at least one result that is not included in the second set of results.

11. The system of claim 10, wherein the second set of results includes at least one result that is not included in the first set of results.

12. A system comprising:
one or more processors; and
one or more memory devices, wherein:
the one or more memory devices and the one or more processors are communicatively connected, and
the one or more memory devices store computer-executable instructions for controlling the one or more processors to:
store, for each user of a plurality of users, data relating to quantities of currencies associated with that user, wherein the quantities of currencies associated with each user include at least two different currencies;
store one or more transaction rules governing transactions that cause a change in the amount of at least one of the quantities of currencies associated with at least one of the users; and
adjust the amount of at least one of the quantities of currencies associated with a first user of the users based on at least one transaction rule of the one or more transaction rules and responsive to one or more inputs.

13. The system of claim 12, wherein at least two of the multiple different currencies are different types of currency selected from the group consisting of: a direct hard currency, an indirect hard currency, a soft currency, a time-based currency, a game progression currency, an informational currency, a variable currency, a social responsibility currency, and a non-national digital currency.

14. The system of claim 12, wherein the one or more transaction rules include at least one transaction rule that:
defines an exchange rate for converting a first amount of a first currency of the different currencies into a second amount of a second currency of the different currencies, wherein the first currency is different from the second currency, and
causes the quantity of the first currency associated with a first user of the users to be decreased by the first amount and the quantity of the second currency associated with the first user to be increased by the second amount of the second currency.

15. The system of claim 12, wherein the one or more memory devices store computer-executable instructions for controlling the one or more processors to:
receive a first request identifying a first entity from a remote device,
determine, responsive to receiving the first request, a first subset of one or more currencies of the currencies that are usable with the first entity for the purposes of making a first purchase, and
provide information indicating the first subset of one or more currencies of the currencies to the remote device.

16. The system of claim 15, wherein the one or more memory devices store computer-executable instructions for controlling the one or more processors to:
receive a second request identifying a second entity from the remote device,
determine, responsive to receiving the second request, a second subset of one or more currencies of the currencies that are usable with the second entity for the purposes of making a second purchase, and
provide information indicating the second subset of one or more currencies of the currencies to the remote device, wherein the second subset includes at least one currency that is not included in the first subset.

17. The system of claim 12, wherein the one or more memory devices store computer-executable instructions for controlling the one or more processors to:
receive a first request from a remote device associated with a first user identifying a first entity and a first desired purchase,
determine, responsive to receiving the first request, a first subset of one or more currencies of the currencies that are usable with the first entity for the purposes of making the first desired purchase,
determine, for each currency in the first subset of one or more currencies, a corresponding amount of that currency that will be accepted by the first entity for the purpose of making the first desired purchase, and
provide, to the remote device, information indicating the corresponding amount of each currency that has been determined as being accepted by the first entity for the purpose of making the first desired purchase.

18. The system of claim 17, wherein the one or more memory devices store computer-executable instructions for controlling the one or more processors to:
receive, from the remote device, information indicative of a selection of a first currency in the first subset of one or more currencies, and
cause the data relating to the quantity of the first currency associated with the first user to be decremented by the corresponding amount for the first currency.

19. A system comprising:
one or more processors; and
one or more memory devices, wherein:
the one or more memory devices and the one or more processors are communicatively connected, and
the one or more memory devices store computer-executable instructions for controlling the one or more processors to:
store, for each digital wallet of a plurality of digital wallets, data relating to one or more quantities of one or more currencies associated with that digital wallet, wherein the plurality of digital wallets includes a first plurality of user digital wallets and a second plurality of group digital wallets;
store, for each of the user digital wallets, first information associating that user digital wallet with a corresponding user, wherein the users associated with the user digital wallets are all different users;
store, for each of the group digital wallets, second information associating that group digital wallet with two or more of the users associated with the user digital wallets;
store one or more transaction rules governing transactions that cause a change in the quantity of at least one of the one or more currencies associated with at least one of the digital wallets; and
adjust the quantity of at least one of the one or more currencies associated with one of the digital wallets based on at least one transaction rule of the one or more transaction rules responsive to one or more inputs.

20. The system of claim 19, wherein:

the one or more memory devices store computer-executable instructions for controlling the one or more processors to:

store one or more group transaction rules, each group transaction rule limiting, for at least a first user of the users associated with a first group digital wallet of the group digital wallets, one or more items selected from the group consisting of:

an ability of the first user to engage in transactions using a portion of at least one of the one or more quantities of one or more currencies associated with the first group digital wallet, a type of transaction that the first user is permitted to engage in using a portion of at least one of the one or more quantities of one or more currencies associated with the first group digital wallet, an entity with which the first user may engage in a transaction using a portion of at least one of the one or more quantities of one or more currencies associated with the first group digital wallet, an ability of the first user to transfer an amount of one of the one or more quantities of the one or more currencies associated with the first group digital wallet to a first user digital wallet associated with the first user, and an ability of the first user to exchange a first amount of one of the one or more quantities of the one or more currencies for a second amount of another currency that is added to one of the other quantities of one or more currencies.

\* \* \* \* \*